US011523261B2

(12) United States Patent
Johansson et al.

(10) Patent No.: US 11,523,261 B2
(45) Date of Patent: Dec. 6, 2022

(54) HANDLING OF SUBSCRIPTION PROFILES FOR A SET OF WIRELESS DEVICES

(71) Applicant: Telefonaktiebolaget LM Ericsson (publ), Stockholm (SE)

(72) Inventors: Petri Mikael Johansson, Bjärred (SE); Per Ståhl, Klagshamn (SE); Abu Shohel Ahmed, Espoo (FI); Mia Meinander, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/267,552

(22) PCT Filed: Aug. 17, 2018

(86) PCT No.: PCT/EP2018/072354
§ 371 (c)(1),
(2) Date: Feb. 10, 2021

(87) PCT Pub. No.: WO2020/035150
PCT Pub. Date: Feb. 20, 2020

(65) Prior Publication Data
US 2021/0385635 A1    Dec. 9, 2021

(51) Int. Cl.
*H04W 8/18* (2009.01)
*H04W 4/60* (2018.01)
(Continued)

(52) U.S. Cl.
CPC ............... *H04W 4/60* (2018.02); *H04W 4/50* (2018.02); *H04W 4/70* (2018.02); *H04W 8/18* (2013.01)

(58) Field of Classification Search
CPC ........... H04W 4/60; H04W 4/50; H04W 4/70; H04W 8/18
See application file for complete search history.

(56) References Cited

U.S. PATENT DOCUMENTS

| 2011/0122774 A1* | 5/2011 | Hassan ............... H04L 63/0272 370/242 |
| 2014/0004827 A1* | 1/2014 | O'Leary ............... H04W 12/35 455/411 |

(Continued)

FOREIGN PATENT DOCUMENTS

WO    2019137630 A1    7/2019

OTHER PUBLICATIONS

International Search Report and Written Opinion of the International Searching Authority for PCT International Application No. PCT/EP2018/072354 dated Apr. 12, 2019.
(Continued)

*Primary Examiner* — Joseph E Dean, Jr.
(74) *Attorney, Agent, or Firm* — Sage Patent Group

(57) ABSTRACT

There is provided mechanisms for handling subscription profiles for a set of wireless devices. A method is performed by an MNO entity. The method includes obtaining a single request for handling subscription profiles for the set of wireless devices. The method includes performing, with a profile provisioning server, a preparation procedure for the set of wireless devices wherein a common batch profile handling parameter for the set of wireless devices is created, and whereby the set of wireless devices are associated with at least one matching identifier for tracking actions relating to the handling of the subscription profiles at the MNO entity and the profile provisioning server.

21 Claims, 14 Drawing Sheets

(51) Int. Cl.
*H04W 4/70* (2018.01)
*H04W 4/50* (2018.01)

(56) References Cited

U.S. PATENT DOCUMENTS

| | | | |
|---|---|---|---|
| 2017/0041284 A1 | 2/2017 | Chen et al. | |
| 2017/0149827 A1* | 5/2017 | Sims | H04L 63/20 |
| 2019/0253884 A1* | 8/2019 | Fan | H04W 8/183 |
| 2020/0045544 A1* | 2/2020 | Yu | H04W 12/35 |

OTHER PUBLICATIONS

Groupe Speciale Mobile Association (GSMA); "eSIM"; Mar. 2018; 25 pages.
Groupe Speciale Mobile Association (GSMA); "Remote SIM Provisioning for Machine to Machine _ Internet of Things" 2018; 5 pages.
Groupe Speciale Mobile Association (GSMA); "SGP.22-RSP Technical Specification v2.2"; Sep. 1, 2017; 264 pages.
Arkko, J. et al.; "RFC 5448—Improved Extensible Authentication Protocol Method for 3rd Generation Authentication and Key Agreement (EAP-AKA')"; Network Working Group; The Internet Society, May 2009; 29 pages.
Aboba, B. et al.; "RFC 3748—Extensible Authentication Protocol (EAP)"; Network Working Group; The Internet Society, Jun. 2004; 67 pages.

\* cited by examiner

HANDLING OF SUBSCRIPTION PROFILES FOR A SET OF WIRELESS DEVICES

CROSS REFERENCE TO RELATED APPLICATION

This application is a 35 U.S.C. § 371 national stage application of PCT International Application No. PCT/EP2018/072354 filed on Aug. 17, 2018, the disclosure and content of which is incorporated by reference herein in its entirety.

TECHNICAL FIELD

Embodiments presented herein relate to methods, devices, computer programs, and a computer program product for handling subscription profiles for a set of wireless devices.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is security. In general terms, proper security mechanisms are needed to prevent misuse of connected devices. As a non-limiting illustrative example, distributed denial of service (DDoS) attacks against popular websites might utilize poorly protected connected devices, such as cameras running the Internet Protocol (IP), routers, digital video recorders running the Internet Protocol, and so on.

Connected devices may also be entrusted with valuable, sensitive, or private data that needs to be protected from unauthorized access. Identity management is a central part of security and device life-cycle management. A connected device generally needs an identity to be able to identify and authenticate itself to its counterparts in the network in order to establish secure communication to other connected devices or services. This is needed at the connectivity layer when connecting to a network and at the application layer when connecting to a service of the network. Secure communication protects sensor data, or control data for actuators, but is also needed for provisioning of identities to the connected device and for secure configuration of the connected device, including secure firmware update. Identities are also the base for an access control mechanism controlling who can access resources of a connected device, including who can provision additional identities to the connected device.

A simplified block diagram of a communications network too is illustrated in FIG. 1. Each of N connected wireless devices 500a, 500b, . . . , 500N is provided network access by a network node 110, such as a network gateway (GW), an access point (AP), or a radio base station (RBS) of a connectivity provider network 120. For example, the connectivity provider network may offer network access using WiFi, or cellular telecommunications systems such as fourth generation wireless system supporting the Long Term Evolution (LTE) standard and/or a fifth generation wireless system. The connectivity provider network 120 further comprises an authentication server 180I, 180E, which could be an authentication, authorization, and accounting (AAA) server, an Authentication Server Function (AUSF) server, or a Mobility Management Entity (MME). Subscriber information for connectivity may be stored in the authentication server 180I, 180E or may be stored in a separate network entity, which could be a home subscriber server (HSS) 140, a Unified Data Management (UDM) server, and/or an Authentication credential Repository and Processing Function (ARPF) server, and which separate network entity also provides authentication material for use by the authentication server 180I, 180E. For network access authentication, the connectivity provider may use an authentication service provided by another vendor. Hence, additionally or alternatively, the authentication server (such as authentication server 180E) may be located outside of the connectivity provider network 120. The connectivity provider network 120 might then be configured to attach to the authentication server 180E outside the connectivity provider network 120 either directly from the network node 110 or via its own (internal) authentication server 180I. Specifically, for providing initial connectivity, before connectivity provider specific subscription information has been downloaded to the wireless device 500a, 500b, . . . , 500N, the connectivity provider may rely on an external authentication service provided by another vendor. The connectivity provider network 120 in turn is operatively connected to a service network 150, such as the Internet, possibly comprising at least one communication device 190 that could be a data server (DS). The service network 150 is further operatively connected to an enterprise network 160. The enterprise network 160 comprises a management server (MS) 170 and possibly at least one communication device 190 that could be a DS.

As an example, the wireless device 500a, 500b, . . . , 500N could belong to the enterprise of the enterprise network 160 and be configured to provide sensor data (or other type of data) to one or more of the communication devices 190 located either in the enterprise network 160 or in the service network 150. The enterprise manages the wireless device 500a, 500b, . . . , 500N through the management server 170. Management comprises providing identities and credentials to the wireless device 500a, 500b, . . . , 500N and the communication device 190 to which the wireless device 500a, 500b, . . . , 500N is communicating with such that secure communication can be established. The connectivity provider network 120 may, partly or fully, also be provided by the enterprise.

The so-called 3GPP identity technology, where 3GPP is short for third generation partnership project, is a well-proven identity technology that might be leveraged as identity technology for constrained devices, not only for constrained devices to access cellular networks, but also for other constrained devices to access non-cellular networks such as WiFi. The 3GPP Authentication and Key Agreement (AKA) protocol is agnostic to the underlying network and can for example be tunnelled in the Extensible Authentication Protocol (EAP) using the EAP-AKA (and EAP-AKA'). EAP is a commonly used authentication and key agreement protocol as part of network attachment, e.g. for WiFi network access. Using EAP-AKA (or EAP-AKA') allows existing security infrastructure (e.g. at enterprises) to be used that easily can integrate with the authentication systems (such as HSS) of mobile network operators (MNOs).

Changing subscription from one mobile network operator to another is for mobile phones today mostly done by physically replacing the existing universal integrated-circuit card (UICC) or subscriber identity module or subscriber identification module (SIM) card with a new UICC/SIM card for the new mobile network operator. For constrained devices installed at remote locations and hard to reach places, sending out maintenance personnel for such an operation is a costly operation, and may even not be possible for some constrained devices (e.g. hermetically sealed constrained devices). Instead, a way of securely updating/changing the subscription from remote is needed.

The so-called embedded UICC (eUICC) is a dedicated UICC chip integrated into the device, i.e. it is not removable. However, at the same time, remote management of the eUICC and the subscriptions stored on it is provided such that users or device owners can change subscriptions for their devices and the new subscription data is provisioned onto the eUICC remotely. GSMA (GSM Association, where GSM is short for Global System for Mobile communication) has specified two variants of such a remote SIM provisioning protocol; one for consumer type devices and one for machine-to-machine (M2M) type devices. For the consumer variant the end-user controls the switch between profiles instead of the operator/remote provisioning server as in the M2M variant.

However, for constrained devices even the use of an embedded UICC may add unreasonable cost to the device. The next phase in the UICC evolution is the integrated UICC (iUICC) in which the UICC is integrated into the System-on-Chip of the modem/application processor. There is today no exact definition of the iUICC. In some aspects, a dedicated central processing unit (CPU) core with its own dedicated memory and peripherals might constitute the iUICC. An iUICC may alternatively be realized using hardware isolation mechanisms such as ARM TrustZone or Intel SGX.

An overview of an architecture of a communications network for connectivity management in the GSMA consumer variant is shown in FIG. 2. The end-user 410 owning and/or using the device may here order a new profile download from an MNO entity 200. The MNO entity 200 acts as a subscription management server and prepares a profile provisioning server, SM-DP+ 300 (short for enhanced Subscription Manager Data Preparation), for the profile download. The end-user 410 triggers the profile download (and switch of profile) via a Local Profile Assistant (LPAd) available in the device via a user interface. The LPAd comprises a Local Discovery (LDSd) entity, a Local Profile Download (LPDd) entity, and a Local User Interface (LUId) entity. The suffix d indicates that the entity is part of the wireless device 500a. An eUICC/iUICC manufacturer (EUM) 460 is the entity that manufactured the eUICC/iUICC. The manufacturer of an iUICC is typically the device manufacturer. The Certificate Issuer (CI) 450 is the issuer of certificates used in profile download and other operations. Operational interfaces are shown as directional arrows connecting the entities 200-500. For example, ES9+ is the interface between SM-DP+ 300 and LPAd/LPDd in the wireless device 500a, and ES10b is the interface between LPAd/LPDd and the eUICC/iUICC, whereas ES8+ is the interface between SM-DP+ 300 and the eUICC/iUICC in the wireless device 500a.

FIG. 3 is a signalling diagram of profile download to the wireless device 500a. For protection of the profile download secure communication is established between the eUICC/iUICC and the SM-DP+ 300 as well between the LPAd and the SM-DP+ 300.

The use of the GSMA consumer variant for constrained wireless devices 500a poses problems in that many constrained wireless devices 500 do not have a user interface for communication with the end-user/device owner 410. Instead the constrained device is managed and configured via a Management Server (MS) using a dedicated management protocol such as LightweightM2M (LwM2M).

A wireless device 500a may by itself not have Internet connectivity (e.g. before first subscription profile download) such that it can connect to the provisioning server SM-DP+ 300. The GSMA RSP consumer variant defines the concept of a companion device and a primary device where a companion device is a communications device that relies on the primary device for connectivity and/or user interface during profile provisioning and local profile management. Secure communication, for example by means of HTTPS (short for HTTP Secure, where HTTP is short for Hypertext Transfer Protocol), is mandated between the companion device and the primary device for protection of the user interface to trigger profile management operations.

The use of the GSMA consumer variant for so-called Internet of Things (IoT) devices poses issues in that many IoT devices do not have a user interface for communication with the end-user/device owner. The concept of companion device and primary device described above allows the device owner/user to interact with the device (i.e. the LPAd) via the network interface from a central controlling unit, such as a device management server. However, many constrained IoT devices do not support HTTPS. For the user interface part a secure communication using e.g. DTLS could be used between the wireless device 500a and the management server.

In some aspects the functionality for local management of profiles provided by the LPAd is split between a proxy device and the wireless device 500a. These two parts of the LPAd will hereinafter be referred to as LPApr and LPAdv. In some aspects the LPApr handles the HTTPS sessions with the SM-DP+ 300 (and SM-DS) and handles the interaction with the user/owner of the device, and the LPAdv handles the interaction with the eUICC/iUICC. A secure communication protocol might be established between the LPApr and the LPAdv using a protocol stack suitable for the wireless device 500a.

Consider an enterprise that manages several hundreds, or even thousands, of identical wireless devices 500a, 500b, . . . , 500N (i.e., where N≥100 or even N≥1000) and contacts an MNO entity 200 to order 3GPP profiles for these wireless devices 500a, 500b, . . . , 500N. The enterprise would then like to make one single order at the MNO entity 200 valid for the whole batch of wireless devices 500a, 500b, . . . , 500N. In some cases information such as eUICC identification (EID) and International Mobile station Equipment Identities (IMEI) about the wireless devices 500a, 500b, . . . , 500N is not yet known when the profile download order is made.

The GSMA RSP consumer variant specification defines four different ways for how profile download can be triggered and performed.

Activation Code: When ordering a 3GPP subscription, the device owner/user is provided with an Activation Code (AC) containing an activation code token (also known as matching identifier or matching ID for short) and address of the SM-DP+ 300 to be contacted for the profile download. The AC is given to the wireless device 500 (when being an ordinary consumer variant) or to a Management Server (MS) (in the case of LPAd split and the LPApr is part of the MS). The profile download is started when the AC is obtained (ordinary consumer variant) or next time when the device registers with MS after the AC has been obtained. The Matching identifier is provided to the SM-DP+ 300 and allows the SM-DP+ 300 to identify the correct profile download order from the MNO entity 200.

Advanced Activation Code: When ordering a 3GPP subscription, the device owner/user is provided with an Advanced Activation Code (AAC). The AAC is provided to the wireless device 500a (when being an ordinary consumer variant) or to the MS (in case of LPAd split and the LPApr is part of the MS). The AAC contains a Uniform Resource Locator (URL) to a web service of the MNO entity 200 from where a signed Activation Code (sometimes referred to as a Command Code) can be obtained. When obtaining the AAC the LPAd triggers the download of the signed AC using the web service. In case of LPAd split LPApr triggers download of the signed AC when a wireless device 500a (without profile) registers with the MS. In both cases the signed AC is bound to the wireless device 500a (i.e. bound to a specific EID). The web service triggers profile download preparation at the SM-DP+ 300, if not already performed when the profile download order was made. The profile download is then started when the signed AC is obtained in the same way as described above.

SM-DS event: As part of ordering and preparing profile download or other profile management operation, an event is registered by the SM-DP+ 300 at an Subscription Manager-Discovery Server (SM-DS) server that a profile management operation (e.g. profile download) is due for a specific wireless device 500a. The eUICC/iUICC identifier (EID) is used to identify the wireless device 500a linked to the profile management operation, i.e. the identity the wireless device 500a for which the event is valid. Hence, the EID must be provided to the MNO entity 200 by the device owner/user at profile ordering. In the case of the ordinary consumer variant the wireless device 500a periodically checks for events at the SM-DS, whose address is registered in the wireless device 500a, and upon retrieving such an event profile download is triggered by the LPAd. The event identifier (EventID) obtained from the SM-DS is in this case used as Matching identifier to be able to locate the correct profile download order at the SM-DP+ 300. The address of the SM-DP+ 300 is also obtained from the event. In the case of LPAd split, the LPApr is triggered to look for events at the SM-DS for a particular device when the device (without profile) registers with the MS.

Default SM-DP+ address: This option assumes that a profile download order is available at the SM-DP+ 300 when the wireless device 500a boots up the first time and that the wireless device 500a uses a default SM-DP+ address preconfigured in the wireless device 500a (ordinary consumer variant) to contact the SM-DP+ 300 to download the profile. An empty Matching identifier is used and the EID is instead used to locate the profile at the SM-DP+ 300. Hence, the EID must be provided to the MNO entity 200 by the device owner/user at profile ordering.

For profile download based on Activation Code and Advanced Activation Code the EID must not necessarily be available and provided to the MNO entity 200 by the device owner/user at profile download ordering. The Matching identifier is in this case enough to identify the profile download order. The SM-DS event mechanism could also be used by the MNO entity 200 to trigger Remote Profile Management (RPM) operations, such as update of a profile and profile metadata and enabling, disabling, and deletion of a profile.

Each of the above disclosed ways for how profile download can be triggered and performed suffers from issues. When performing profile download based on either the AC or the ACC, the current GSMA RSP consumer variant specification only allows wireless devices 500a to be handled individually, one by one. With the current GSMA RSP specification based on either the SM-DS event or the default SM-DP+ address, the EID is required to be known. Hence, these alternatives do not work for profile handling when the EID values are not yet known.

Hence, there is still a need for improved handling of subscription profiles for wireless devices.

SUMMARY

An object of embodiments herein is to provide efficient handling of subscription profiles for wireless devices, and efficient handling of subscription profiles for a set of wireless devices in particular.

According to a first aspect there is presented a method for handling subscription profiles for a set of wireless devices. The method is performed by an MNO entity. The method comprises obtaining a single request for handling subscription profiles for the set of wireless devices. The method comprises performing, with a profile provisioning server, a preparation procedure for the set of wireless devices wherein a common batch profile handling parameter for the set of wireless devices is created, and whereby the set of wireless devices are associated with at least one matching identifier for tracking actions relating to the handling of the subscription profiles at the MNO entity and the profile provisioning server.

According to a second aspect there is presented an MNO entity for handling subscription profiles for a set of wireless devices. The MNO entity comprises processing circuitry. The processing circuitry is configured to cause the MNO entity to obtain a single request for handling subscription profiles for the set of wireless devices. The processing circuitry is configured to cause the MNO entity to perform, with a profile provisioning server, a preparation procedure for the set of wireless devices wherein a common batch profile handling parameter for the set of wireless devices is created, and whereby the set of wireless devices are associated with at least one matching identifier for tracking actions relating to the handling of the subscription profiles at the MNO entity and the profile provisioning server.

According to a third aspect there is presented a computer program for handling subscription profiles for a set of wireless devices. The computer program comprises computer program code which, when run on processing circuitry of an MNO entity, causes the MNO entity to perform a method according to the first aspect.

According to a fourth aspect there is presented a method for handling subscription profiles for a set of wireless devices. The method is performed by a profile provisioning server. The method comprises performing, with an MNO entity, a preparation procedure for the set of wireless devices wherein a common batch profile handling parameter for the set of wireless devices is created, and whereby the set of wireless devices are associated with at least one matching identifier for tracking actions relating to the handling of the subscription profiles at the MNO entity and the profile provisioning server. The method comprises performing, with a profile management entity and one of the wireless devices, a procedure for handling the subscription profile of the wireless device, during which procedure the profile provisioning server receives from the wireless device a message comprises the matching identifier as signed by the wireless device.

According to a fifth aspect there is presented a profile provisioning server for handling subscription profiles for a set of wireless devices. The profile provisioning server comprises processing circuitry. The processing circuitry is configured to cause the profile provisioning server to performing, with an MNO entity, a preparation procedure for the set of wireless devices wherein a common batch profile handling parameter for the set of wireless devices is created, and whereby the set of wireless devices are associated with at least one matching identifier for tracking actions relating to the handling of the subscription profiles at the MNO entity and the profile provisioning server. The processing circuitry is configured to cause the profile provisioning server to perform, with a profile management entity and one of the wireless devices, a procedure for handling the subscription profile of the wireless device, during which procedure the profile provisioning server receives from the wireless device a message comprises the matching identifier as signed by the wireless device.

According to a sixth aspect there is presented a computer program for handling subscription profiles for a set of wireless devices. The computer program comprises computer program code which, when run on processing circuitry of a profile provisioning server, causes the profile provisioning server to perform a method according to the fourth aspect.

According to a seventh aspect there is presented a method for handling subscription profiles for a set of wireless devices. The method is performed by a profile management entity. The method comprises obtaining a common batch profile handling parameter for the set of wireless devices. The method comprises performing, with the profile provisioning server and one of the wireless devices, a procedure for handling the subscription profile of the wireless device, during which procedure the profile management entity provides to the wireless device a message comprises the batch profile handling parameter and/or a matching identifier for tracking actions relating to the handling of the subscription profiles at an MNO entity and the profile provisioning server, where upon receiving the message the wireless device provides to the profile provisioning server a message comprises the matching identifier as signed by the wireless device.

According to an aspect there is presented a profile management entity for handling subscription profiles for a set of wireless devices. The profile management entity comprises processing circuitry. The processing circuitry is configured to cause the profile management entity to obtain a common batch profile handling parameter for the set of wireless devices. The processing circuitry is configured to cause the profile management entity to perform, with the profile provisioning server and one of the wireless devices, a procedure for handling the subscription profile of the wireless device, during which procedure the profile management entity provides to the wireless device a message comprises the batch profile handling parameter and/or a matching identifier for tracking actions relating to the handling of the subscription profiles at an MNO entity and the profile provisioning server, where upon receiving the message the wireless device provides to the profile provisioning server a message comprises the matching identifier as signed by the wireless device.

According to a ninth aspect there is presented a computer program for handling subscription profiles for a set of wireless devices. The computer program comprises computer program code which, when run on processing circuitry of a profile management entity, causes the profile management entity to perform a method according to the seventh aspect.

According to a tenth aspect there is presented a method for a handling subscription profile for a wireless device. The method is performed by the wireless device. The method comprises performing, with a profile management entity and a profile provisioning server, a procedure for handling the subscription profile of the wireless device, during which procedure the wireless device obtains from the profile management entity a message comprises a batch profile handling parameter and/or a matching identifier, wherein the batch profile handling parameter is common for a set of wireless devices to which the wireless device belongs, and wherein the set of wireless devices are associated with at least one matching identifier for tracking actions relating to the handling of the subscription profiles at an MNO entity and the profile provisioning server, and where upon receiving the message the wireless device provides to the profile provisioning server a message comprises the matching identifier as signed by the wireless device.

According to an eleventh aspect there is presented a wireless device for handling a subscription profile for a wireless device. The wireless device comprises processing circuitry. The processing circuitry is configured to cause the wireless device to perform, with a profile management entity and a profile provisioning server, a procedure for handling the subscription profile of the wireless device, during which procedure the wireless device obtains from the profile management entity a message comprises a batch profile handling parameter and/or a matching identifier, wherein the batch profile handling parameter is common for a set of wireless devices to which the wireless device belongs, and wherein the set of wireless devices are associated with at least one matching identifier for tracking actions relating to the handling of the subscription profiles at an MNO entity and the profile provisioning server, and where upon receiving the message the wireless device provides to the profile provisioning server a message comprises the matching identifier as signed by the wireless device.

According to a twelfth aspect there is presented a computer program for handling a subscription profile for a wireless device. The computer program comprises computer program code which, when run on processing circuitry of a wireless device, causes the wireless device to perform a method according to the tenth aspect.

According to a thirteenth aspect there is presented a computer program product comprises a computer program according to at least one of the third aspect, the sixth aspect, the ninth aspect, and the twelfth aspect and a computer readable storage medium on which the computer program is stored. The computer readable storage medium can be a non-transitory computer readable storage medium.

Advantageously these methods, these MNO entities, these profile provisioning servers, these profile management entities, these wireless devices, and these computer programs provide efficient handling of subscription profiles for a set of wireless devices.

Advantageously these methods, these MNO entities, these profile provisioning servers, these profile management entities, these wireless devices, and these computer programs enable simple and efficient procedures for profile download and RPM operations for an enterprise with a set of wireless devices.

Advantageously these methods, these MNO entities, these profile provisioning servers, these profile management entities, these wireless devices, and these computer programs allow profile download ordering to be carried out even before the individual identities of the wireless devices are available.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

As disclosed above there is still a need for improved handling of subscription profiles for wireless devices.

According to the herein disclosed embodiments an enterprise with hundreds, or even thousands, of wireless devices 500a is, by means of a single batch order, enabled to order 3GPP profiles for the wireless devices 500a, 500b, ..., 500N from an MNO entity 200. The MNO entity 200 and a profile provisioning server 300 are therefore configured to support handling of a batch of profiles. In some examples the profile provisioning server 300 is represented by the SM-DP+.

Figure 4:
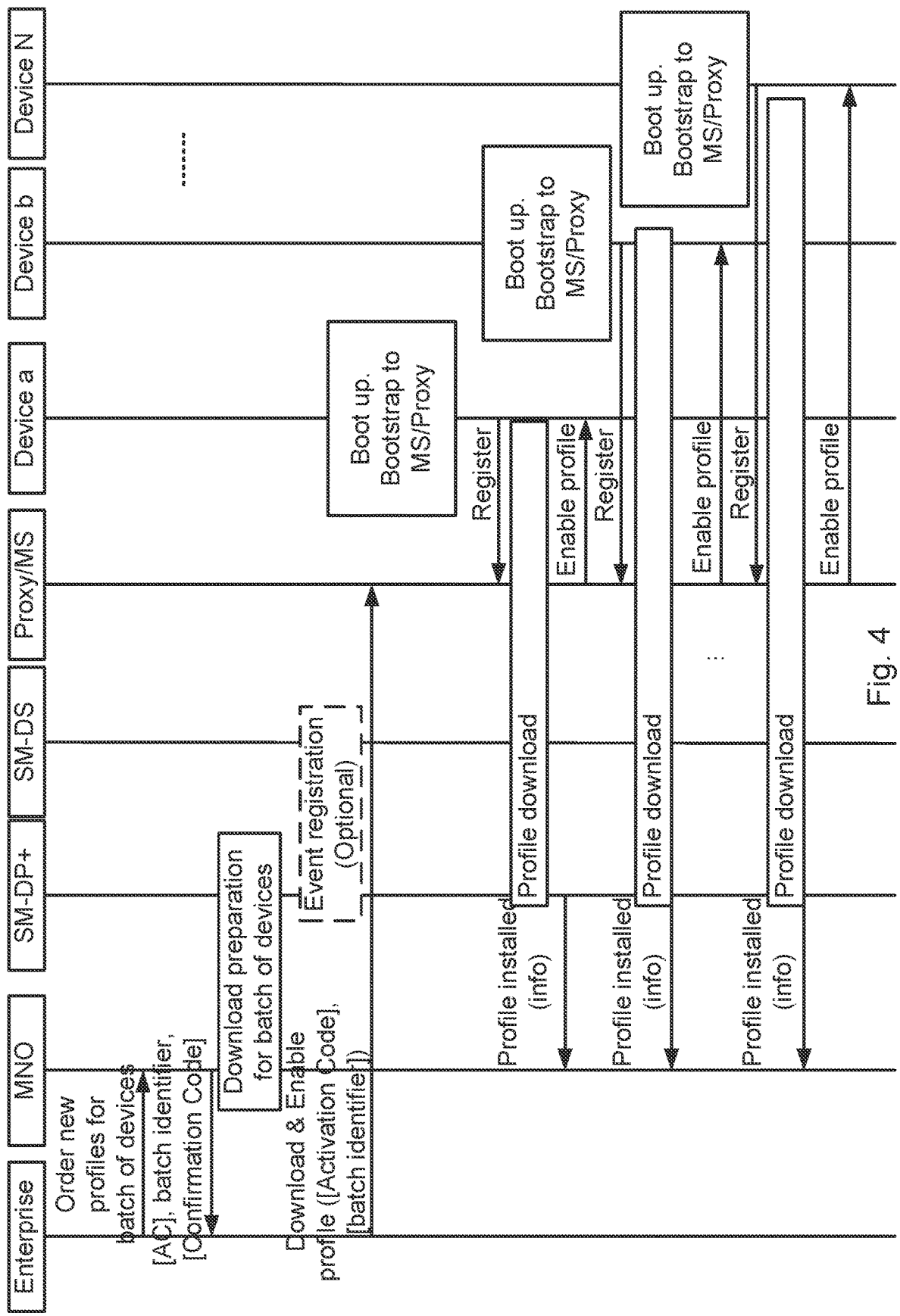
FIGS. 4, 5, 10, and 11 are signalling diagrams according to embodiments

Reference is made to the signalling diagram of FIG. 4 illustrating profile ordering and download for a set of wireless devices 500a, 500b, ..., 500N.

The enterprise contacts a connectivity and/or identity provider in the form of an MNO entity 200 in order to place an order where 3GPP identities are requested and subscriptions are ordered for a set of wireless devices 500a, 500b, ..., 500N (message: "Order new profiles for batch of devices"). The MNO entity 200 typically is reachable by the enterprise by means of a web-portal where the enterprise can register orders and provide payment information, subscription billing information, etc. A single batch order is made for the set of wireless devices 500a, 500b, ..., 500N. The enterprise provides information about the set of wireless devices 500a, 500b, ..., 500N and the requested profile (message: "[AC], batch identifier, [Confirmation Code]"). For example, this information may specify that the set of wireless devices 500a, 500b, ..., 500N are constrained IoT devices equipped with an NB-IoT modem and only supports minimal profiles for IoT containing only USIM (UMTS Subscriber Identify Module, where UMTS is short for Universal Mobile Telecommunications System) application information relevant for NB-IoT, etc. The order may be placed prior to the wireless devices 500a, 500b, ..., 500N have arrived at the enterprise and thus no device identity information might yet be available when the order is placed.

Upon receiving the order, the MNO entity 200 interacts with the SM-DP+ 300 to prepare the profile download (procedure: "Download preparation for batch of devices"). The SM-DP+ 300 may have the same owner as the MNO entity 200 or the owner of the MNO entity 200 might license profile download service from a third party. In the download preparation phase the SM-DP+ 300 prepares protected profile packages based on input (such as type of profile, IMSI range, integrated circuit card identifier (ICCID) range) from the MNO entity 200. The MNO 200 may also provide identity information of the wireless devices 500a, 500b, ..., 500N, if available. In particular, the eUICC/iUICC identifier (EID) can, if available, be used as device identifier. The MNO entity 200 and the SM-DP+ 300 also agree on identifier(s), called Matching identifier(s), that is/are used to track the profile download order at both entities. The MNO entity 200 also obtains IMSI and subscription key pairs for each wireless device 500a, 500b, ..., 500N. IMSI and subscription key pairs stored (such as in the Home Subscriber Server (HSS), Home Location Register (HLR), or authentication center (AuC)) such that network access authentication can be performed once the profile is downloaded.

Following the download preparation process the MNO entity 200 prepares information to the enterprise needed for the profile download. This may be an Activation Code (AC) and/or batch identifier depending on how the profile download is triggered. The Activation Code (AC) and batch identifier (BID) is sensitive data and should not be sent as plain text between the entities. To prevent against unauthorized profile download, the enterprise may also receive a Confirmation Code. The Confirmation Code serves as a secret that needs to be presented to the SM-DP+ 300 at each profile download. The use of the Confirmation Code to prevent unauthorized profile download is further described below. If the profile download is triggered using an SM-DS event then the SM-DP+ 300 contacts the SM-DS to register such an event (procedure: "Event registration OPTIONAL"). Further details of the download preparation phase will be described below.

Once the wireless devices 500a, 500b, . . . , 500N are installed and booted up for the first time they bootstrap and register with a profile management entity 400, such as a Management Server (MS), selected by the enterprise (procedure: "Device first boots up, bootstrap to MS/Proxy"). A state-of-the-art bootstrap mechanism can be used and is thus not described further herein. The wireless devices 500a, 500b, . . . , 500N register one by one at the profile management entity 400 and profile download is then triggered (one by one) for the wireless devices 500a, 500b, . . . , 500N (message: Register). Each wireless device 500a, 500b, . . . , 500N performs a profile download process with the SM-DP+ 300 to download the 3GPP profile (procedure: "Profile download" and messages "Profile installed (info)" and "Enable profile"). This process depends on whether an Activation Code is used to trigger profile download or if the SM-DS event mechanism is used to trigger profile download. It also depends on if the LPAd is split up and a proxy is used for profile download or if the wireless device 500a, 500b, . . . , 500N itself is configured with the functionality of the full LPAd. As part of profile download, detailed information, such as IMEI and EID, becomes known to the SM-DP+ 300 and may be provided further to the MNO entity 200 if not already available at the MNO entity 200.

In a first example the SM-DS event mechanism is used for triggering profile download. In general terms, instead of binding each event to a specific wireless device 500a, 500b, . . . , 500N identified by its EID, an event valid for the complete set of wireless devices 500a, 500b, . . . , 500N is bound to a common batch identifier (e.g. formatted as an EID value). The download preparation part of the profile ordering between the MNO entity 200 and SM-DP+ 300 is extended to handle a batch order using the common batch identifier and a common Matching identifier and the SM-DP+ 300 profile download behavior is extended to support the use of a common Matching identifier valid for several profile downloads (of wireless devices 500a, 500b, . . . , 500N in the same set). The batch identifier is selected by the MNO entity 200 and provided to the SM-DP+ 300 and the enterprise. For example, the batch identifier could be the identifier used by the enterprise to reference the batch order made at the MNO entity 200. The enterprise makes the batch identifier available to the LPApr for use when checking for SM-DS events. Alternatively, for a set of wireless devices 500a, 500b, . . . , 500N configured with the functionality of the full LPAd, the enterprise makes the batch identifier available for download from a server (e.g. device management server) whose address is configured in the wireless devices 500a, 500b, . . . , 500N or obtained during bootstrap of the wireless devices 500a, 500b, . . . , 500N.

In a second example a common Activation Code (AC) for the complete set of devices is used for triggering profile download. The AC is obtained by the enterprise from the MNO entity 200 and provided to the LPApr, or put on a server for download to the LPAd, depending on the type of wireless devices 500a, 500b, . . . , 500N as described above. The download preparation part of the profile ordering between the MNO entity 200 and SM-DP+ 300 is extended to handle a batch order using a common Matching identifier and the SM-DP+ 300 profile download behavior is extended to support the use of a common Matching identifier valid for several profile downloads (of wireless devices 500a, 500b, . . . , 500N in the same set). The common Matching identifier is contained in the common AC. In an alternative within the second example each wireless device 500a, 500b, . . . , 500N in the set uses a different Matching identifier from a given range. The download preparation between the MNO entity 200 and SM-DP+ 300 is then extended to handle a batch order using a range of Matching identifiers and the AC format is extended to support a range of Matching identifiers such that a common AC can be used.

In both examples a Confirmation Code can be used to increase protection and to prevent any other device getting hold of the Matching identifier(s) valid for the set of wireless devices 500a, 500b, . . . , 500N to perform an unauthorized profile download. The confirmation code might be made available to the LPApr or could be obtained from a server along with the access code and/or batch identifier.

Figure 5:
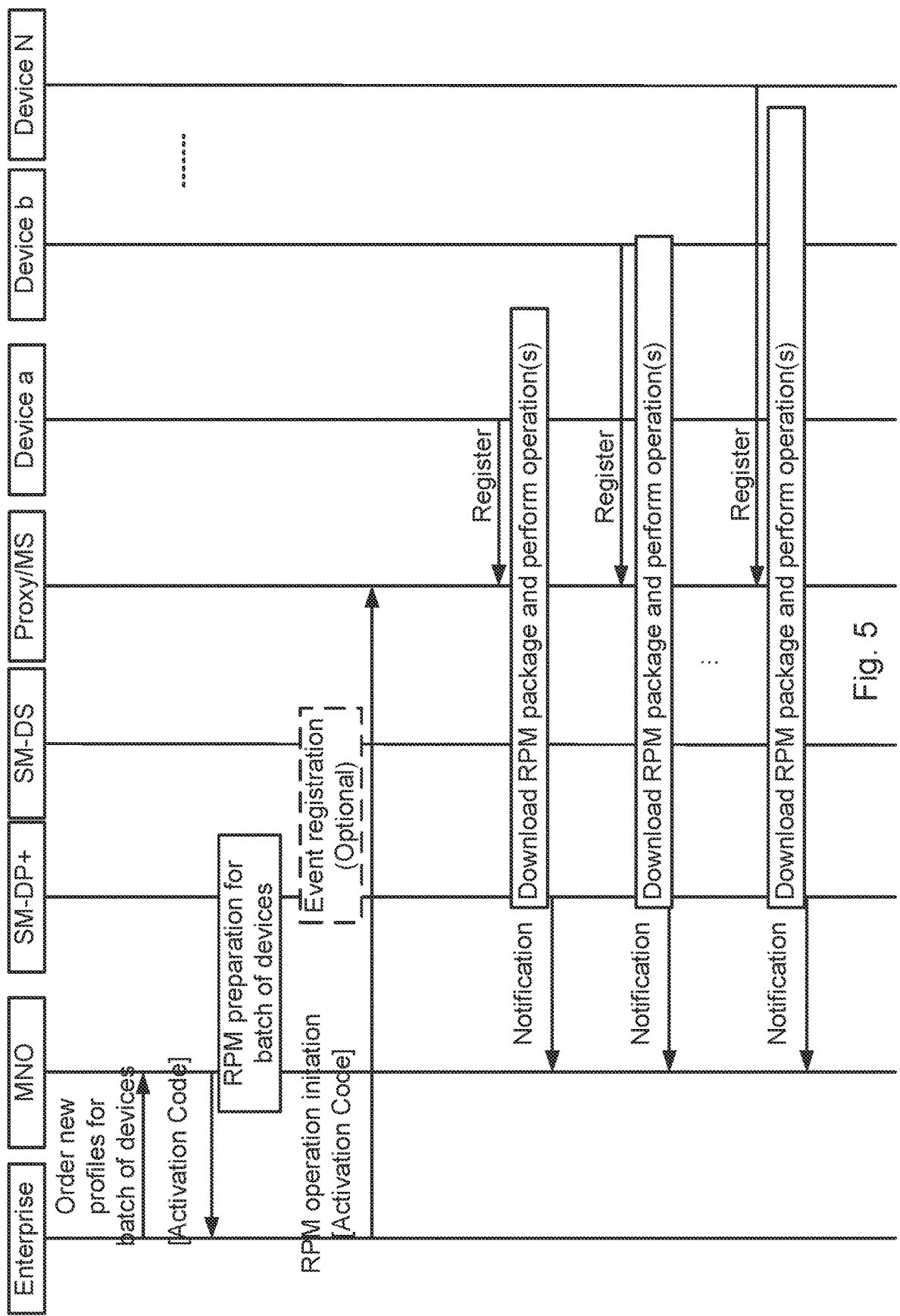

Reference is made to the signalling diagram of FIG. 5 illustrating handling of RPM operations for a set of wireless devices 500a, 500b, . . . , 500N.

The enterprise might, by means of one single batch order, order RPM operations for its wireless devices 500a, 500b, . . . , 500N from an MNO entity 200 (message: "Order RPM operation (batch identifier)"). Such an RPM operation may be to disable an enabled profile for all the wireless devices 500a, 500b, . . . , 500N in the set. The enterprise is then typically using the same web portal as for subscription ordering and entering the batch identifier that it obtained at subscription ordering Alternatively, the MNO entity 200 itself might order/trigger RPM operations for a set of wireless devices 500a, 500b, . . . , 500N based on needed profile updates. For example, there might be an agreement between the enterprise and the MNO entity 200 at subscription ordering that the MNO entity 200 is allowed and should perform certain RPM operations. For example, the MNO entity 200 may be allowed to update the profiles in the wireless devices 500a, 500b, . . . , 500N and update their metadata. In the same way as was done for profile download ordering, an RPM preparation phase is conducted between the MNO entity 200 and the SM-DP+ 300 (procedure: "RPM preparation for batch of devices"). The communication between the MNO entity 200 and the SM-DP+ 300 then supports ordering of RPM operations for a set of wireless devices 500a, 500b, . . . , 500N, where the EID for all wireless devices 500a, 500b, . . . , 500N in the set is transferred from the MNO entity 200 to the SM-DP+ 300 along with a mapping towards the ICCID. The use of one common SM-DS event valid for the whole set of wireless devices 500a, 500b, . . . , 500N and one AC valid for the whole batch applies also here.

The handling of RPM operations for the set of wireless devices 500a, 500b, . . . , 500N is roughly the same as the profile ordering and download for the set of wireless devices 500a, 500b, . . . , 500N except that when handling of RPM operations the MNO entity 200 has access to the EID values of the wireless devices 500a, 500b, . . . , 500N in the set and provides them and associated ICCID values to the SM-DP+ 300. This might be necessary to locate the correct RPM package (bound to an ICCID) for a particular one of the wireless device 500a, 500b, . . . , 500N (having a specific EID). If an order for handling RPM operations is made by the enterprise, an AC may be returned to the enterprise by the MNO entity 200 (messages: "[Activation code]" and "RPM operation initiation [Activation Code]"). Alternatively, the SM-DS event mechanism can be used to trigger RPM operations (procedure: "Event registration (OPTIONAL)"). In this latter case the SM-DP+ 300 contacts the SM-DS to register such an event.

The wireless devices 500a, 500b, ..., 500N register one by one at the profile management entity 400 and download of an RPM package is then triggered (one by one) for the wireless devices 500a, 500b, ..., 500N (message: Register). Each wireless device 500a, 500b, ..., 500N performs a download process with the SM-DP+ 300 to download the RPM package (procedure: "download RPM package and perform operation(s)" and message "Notification"). This process depends on whether an Activation Code or if the SM-DS event mechanism is used to trigger download of the RPM package.

Further details of triggering and execution of the RPM operation(s) is described below.

Figure 6:
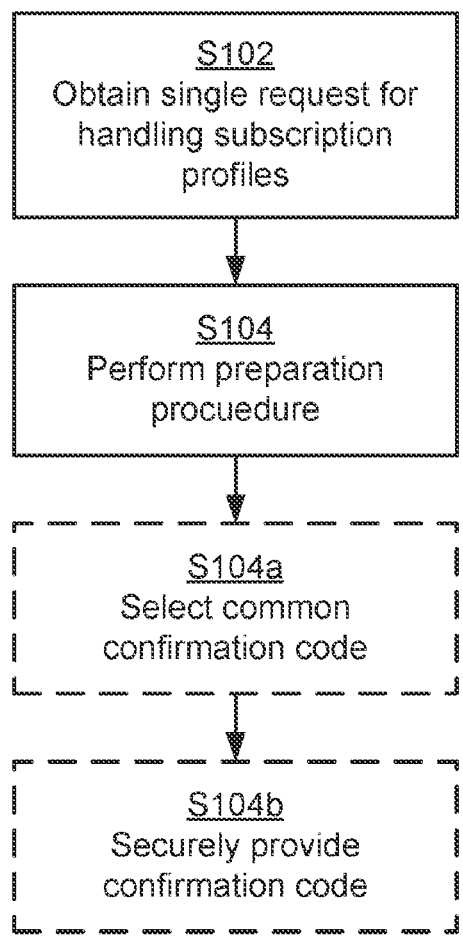
FIGS. 6, 7, 8, and 9 are flowcharts of methods according to embodiments.

Reference is now made to FIG. 6 illustrating a method for handling subscription profiles for a set of wireless devices 500a, 500b, ..., 500N as performed by the MNO entity 200 according to an embodiment.

S102: The MNO entity 200 obtains a single request for handling subscription profiles for the set of wireless devices 500a, 500b, ..., 500N.

S104: The MNO entity 200 performs, with the profile provisioning server 300, a preparation procedure for the set of wireless devices 500a, 500b, ..., 500N. A common batch profile handling parameter for the set of wireless devices 500a, 500b, ..., 500N is created during the preparation procedure. By means of the preparation procedure the set of wireless devices 500a, 500b, ..., 500N are associated with at least one matching identifier. The at least one matching identifier enables actions relating to the handling of the subscription profiles at the MNO entity 200 and the profile provisioning server 300 to be tracked.

This enables simplification of the interface between the MNO entity 200 and the SM-DP+ 300, allowing efficient handling of a whole set of wireless devices 500a, 500b, ..., 500N with common functions/operations instead of on a per device basis. These common functions/operations enable the use of profile download and RPM operations with a common BID and/or a common Activation Code.

Embodiments relating to further details of handling subscription profiles for a set of wireless devices 500a, 500b, ..., 500N as performed by the MNO entity 200 will now be disclosed.

There may be different types of handling of the subscription profiles.

According to some examples the handling pertains to subscription download to the set of wireless devices 500a, 500b, ..., 500N, and the MNO entity 200 as part of performing the preparation procedure orders subscription profiles for the set of wireless devices 500a, 500b, ..., 500N from the profile provisioning server 300.

According to some examples the handling pertains to remote profile management of the set of wireless devices 500a, 500b, ..., 500N, and the MNO entity 200 as part of performing the preparation procedure orders one or more remote profile management operations for the set of wireless devices 500a, 500b, ..., 500N from the profile provisioning server 300.

According to some examples, when the set of wireless devices 500a, 500b, ..., 500N are bound to a common batch profile handling parameter (such as BID or AC), the MNO entity 200 as part of performing the preparation procedure (when the handling pertains to remote profile management of the set of wireless devices 500a, 500b, ..., 500N) provides batch profile handling parameter to the profile provisioning server 300. The batch profile handling parameter has been generated in conjunction with a preparation process having been performed for subscription download to the set of wireless devices 500a, 500b, ..., 500N.

According to some examples there is one single matching identifier (such as one Matching identifier) common for all of the wireless devices 500a, 500b, ..., 500N in the set of wireless devices 500a, 500b, ..., 500N, or one range of matching identifiers (such as a range of Matching identifiers) for the set of wireless devices 500a, 500b, ..., 500N.

According to some examples the at least one matching identifier is generated by either the MNO entity 200 or the profile provisioning server 300.

According to some examples, when the handling pertains to subscription download to the set of wireless devices 500a, 500b, ..., 500N, the order for subscription profiles is performed without device identity information of the set of wireless devices 500a, 500b, ..., 500N being available to the MNO entity 200 and the profile provisioning server 300. The device identity information is obtained by the profile provisioning server 300 from each wireless device 500a in the set of wireless devices 500a, 500b, ..., 500N during subscription profile download. The device identity information of each wireless device 500a is included in the message with the matching identifier from the wireless device 500a to the profile provisioning server 300. Each piece of device identity information is bound to one out of the set of subscription profiles at the profile provisioning server 300.

According to some examples the MNO entity 200 as part of performing the preparation procedure provides device identity information of the set of wireless devices 500a, 500b, ..., 500N to the profile provisioning server 300.

According to some examples a confirmation code is selected by the MNO entity 200. Then the MNO entity 200 could be configured to perform optional steps S104a, S104b:

S104a (optional): The MNO entity 200 selects a common confirmation code for the set of wireless devices 500a, 500b, ..., 500N.

S104b (optional): The MNO entity 200 securely provides, to the profile provisioning server 300 and towards the profile management entity 400, the confirmation code.

Steps S104a and S104b could be performed as part of step S104.

If an SM-DS event is used, a BID could be generated by the MNO entity 200. That is, according to some examples the batch profile handling parameter comprises a batch identifier generated by the MNO entity 200 as part of performing the preparation procedure and the MNO entity 200 provides the batch identifier to the profile provisioning server 300.

The SM-DS event mechanism with a common BID can in this case be used both for profile download and RPM operations.

If an Activation Code is used, the MNO entity 200 might generate an Activation Code. That is, according to some examples the batch profile handling parameter comprises an activation code for the set of wireless devices 500a, 500b, ..., 500N generated by the MNO entity 200.

For the Activation Code option one common Activation Code valid for all wireless devices 500a, 500b, ..., 500N in the set can thus be used.

Figure 7:
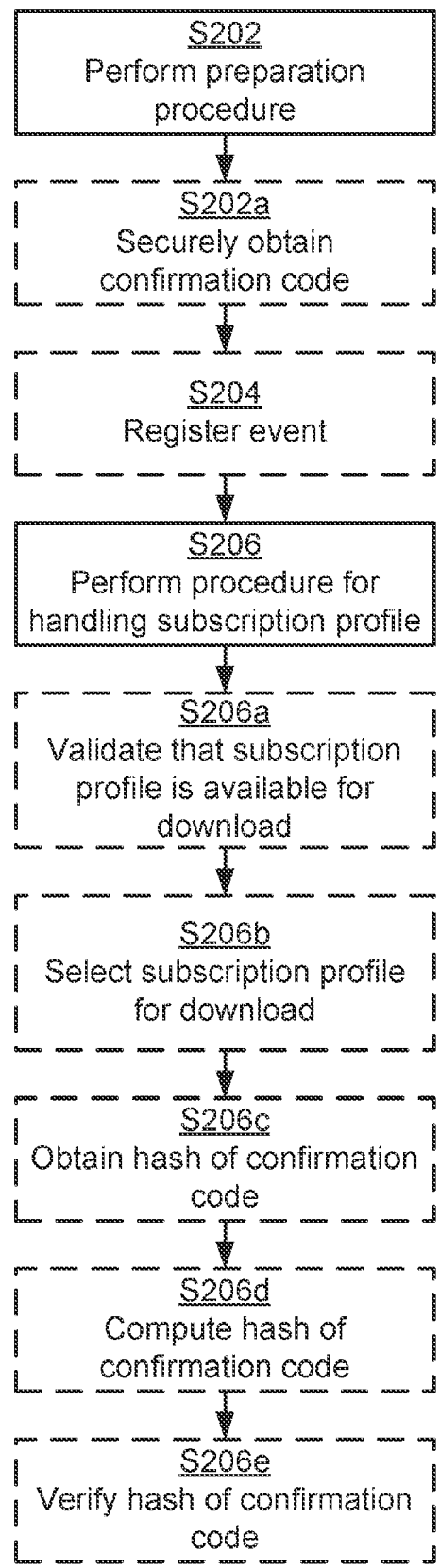

Reference is now made to FIG. 7 illustrating a method for handling subscription profiles for a set of wireless devices 500a, 500b, ..., 500N as performed by the profile provisioning server 300 according to an embodiment.

S202: The profile provisioning server 300 performs, with the MNO entity 200, a preparation procedure for the set of wireless devices 500a, 500b, ..., 500N. A common batch profile handling parameter for the set of wireless devices 500a, 500b, ..., 500N is created during the preparation procedure. By means of the preparation procedure the set of wireless devices 500a, 500b, ..., 500N are associated with at least one matching identifier. The at least one matching identifier enables actions relating to the handling of the subscription profiles at the MNO entity 200 and the profile provisioning server 300 to be tracked.

S206: The profile provisioning server 300 performs, with the profile management entity 400 and one of the wireless devices 500a, 500b, ..., 500N, a procedure for handling the subscription profile of the wireless device 500a, during which procedure the profile provisioning server 300 receives from the wireless device 500a a message comprising the matching identifier as signed by the wireless device 500a.

Embodiments relating to further details of handling subscription profiles for a set of wireless devices 500a, 500b, ..., 500N as performed by the profile provisioning server 300 will now be disclosed.

As disclosed above, according to some examples, the handling pertains to subscription download to the set of wireless devices 500a, 500b, ..., 500N, and the profile provisioning server 300 as part of performing the preparation procedure receives an order for subscription profiles for the set of wireless devices 500a, 500b, ..., 500N from the MNO entity 200.

As disclosed above, according to some examples, the handling pertains to remote profile management of the set of wireless devices 500a, 500b, ..., 500N, and the profile provisioning server 300 as part of performing the preparation procedure receives an order for one or more remote profile management operations for the set of wireless devices 500a, 500b, ..., 500N from the MNO entity 200.

As disclosed above, according to some examples, when the handling pertains to remote profile management of the set of wireless devices 500a, 500b, ..., 500N, and when the set of wireless devices 500a, 500b, ..., 500N are bound to a common batch profile handling parameter, the profile provisioning server 300, as part of performing the preparation procedure obtains the batch profile handling parameter from the MNO entity 200. The batch profile handling parameter has been generated in conjunction with a preparation process having been performed for subscription download to the set of wireless devices 500a, 500b, ..., 500N.

As disclosed above, according to some examples the at least one matching identifier is generated by either the MNO entity 200 or the profile provisioning server 300.

According to some examples, as disclosed above, when the handling pertains to subscription download to the set of wireless devices 500a, 500b, ..., 500N, the order for subscription profiles is performed without device identity information of the set of wireless devices 500a, 500b, ..., 500N being available to the MNO entity 200 and the profile provisioning server 300. The device identity information is obtained by the profile provisioning server 300 from each wireless device 500a in the set of wireless devices 500a, 500b, ..., 500N during subscription profile download. The device identity information of each wireless device 500a is included in the message with the matching identifier from the wireless device 500a to the profile provisioning server 300. Each piece of device identity information is bound to one out of the set of subscription profiles at the profile provisioning server 300.

According to some examples the profile provisioning server 300 as part of performing the preparation procedure obtains device identity information of the set of wireless devices 500a, 500b, ..., 500N from the MNO entity 200.

According to some examples, in the case of LPAd split, the profile provisioning server 300, in step S206, receives the message comprising the matching identifier from the wireless device 500a via the profile management entity 400.

According to some examples the profile provisioning server 300 as part of performing the preparation procedure prepares protected profile packages for the set of wireless devices 500a, 500b, ..., 500N.

As disclosed above, in some examples, a confirmation code is selected by the MNO entity 200. The profile provisioning server 300 could then be configured to perform (optional) step S202a:

S202a (optional): The profile provisioning server 300 securely obtains, from the MNO entity 200, a common confirmation code for the set of wireless devices 500a, 500b, ..., 500N.

Step S202a could be performed as part of step S202.

According to some examples, as disclosed above, when the handling pertains to subscription download to the set of wireless devices 500a, 500b, ..., 500N, and when one common matching identifier is used for the set of wireless devices 500a, 500b, ..., 500N, the message received from the wireless device 500a as part of the procedure for handling the subscription profile of the wireless device 500a comprises the device identifier linked to the common matching identifier through the signature on the common matching identifier by the wireless device 500a. The profile provisioning server 300 could then, upon successful verification of the signature, be configured to perform (optional) steps S206a and S206b:

S206a (optional): The profile provisioning server 200 uses stored records of mappings between subscription profiles, matching identifiers and device identifiers, to validate that a subscription profile mapped to the received matching identifier is available for download that is not already associated with any device identifier and that the received device identifier has not previously been used in successful profile download of a subscription profile associated with the received matching identifier. The profile provisioning server 200 is then, in case of successful validation, configured to perform step S206b:

S206b (optional): The profile provisioning server 200 selects one of the available subscription profiles for download and store the mapping between the received device identifier and the selected subscription profile.

Steps S206a and S206b might be performed as part of step S206.

In some examples the profile provisioning server 300 verifies a hashed Confirmation Code unique per wireless device 500a, 500b, ..., 500N. In some aspects the procedure for handling the subscription profile of the wireless device 500a thus involves the profile provisioning server 300 to perform steps S206c, S206d, S206e:

S206c (optional): The profile provisioning server 300 obtains, from the wireless device 500a, a hash of the confirmation code as part of the procedure for handling the subscription profile of the wireless device 500a.

S206d (optional): The profile provisioning server 300 computes the hash of the confirmation code for the wireless device 500a. The confirmation code for the wireless device 500a is computed as the hash of the common confirmation code and a device identifier for the wireless device 500a.

The device identifier is provided as part of the procedure for handling the subscription profile of the wireless device 500a.

S206e (optional): The profile provisioning server 300 verifies that the hash of the confirmation code received from the wireless device 500a matches the computed hash of the confirmation code.

Steps S206c, S206d, S206e might be performed as part of step S206 prior to, after, or mixed with steps S206a and S206b.

As disclosed above, according to some examples, the batch profile handling parameter comprises a batch identifier generated by the MNO entity 200 as part of performing the preparation procedure and the profile provisioning server 300 obtains the batch identifier from the MNO entity 200.

If an SM-DS event is used, the profile provisioning server 300 might register events with the SM-DS. That is, in some examples the profile provisioning server 300 is configured to perform step S204:

S204 (optional): The profile provisioning server 300 registers an event of the handling of the subscription profiles with an SM-DS.

If an SM-DS event is used, the matching identifier might be used as event identifiers. That is, according to some examples the at least one matching identifier is a common matching identifier for the set of wireless devices 500a, 500b, . . . , 500N and is used as event identifier (of the event).

If an SM-DS event is used, the BID can be used as device identifier (instead of EID). That is, according to some examples the batch identifier is used as device identifier during registration of the event with the SM-DS.

Figure 8:
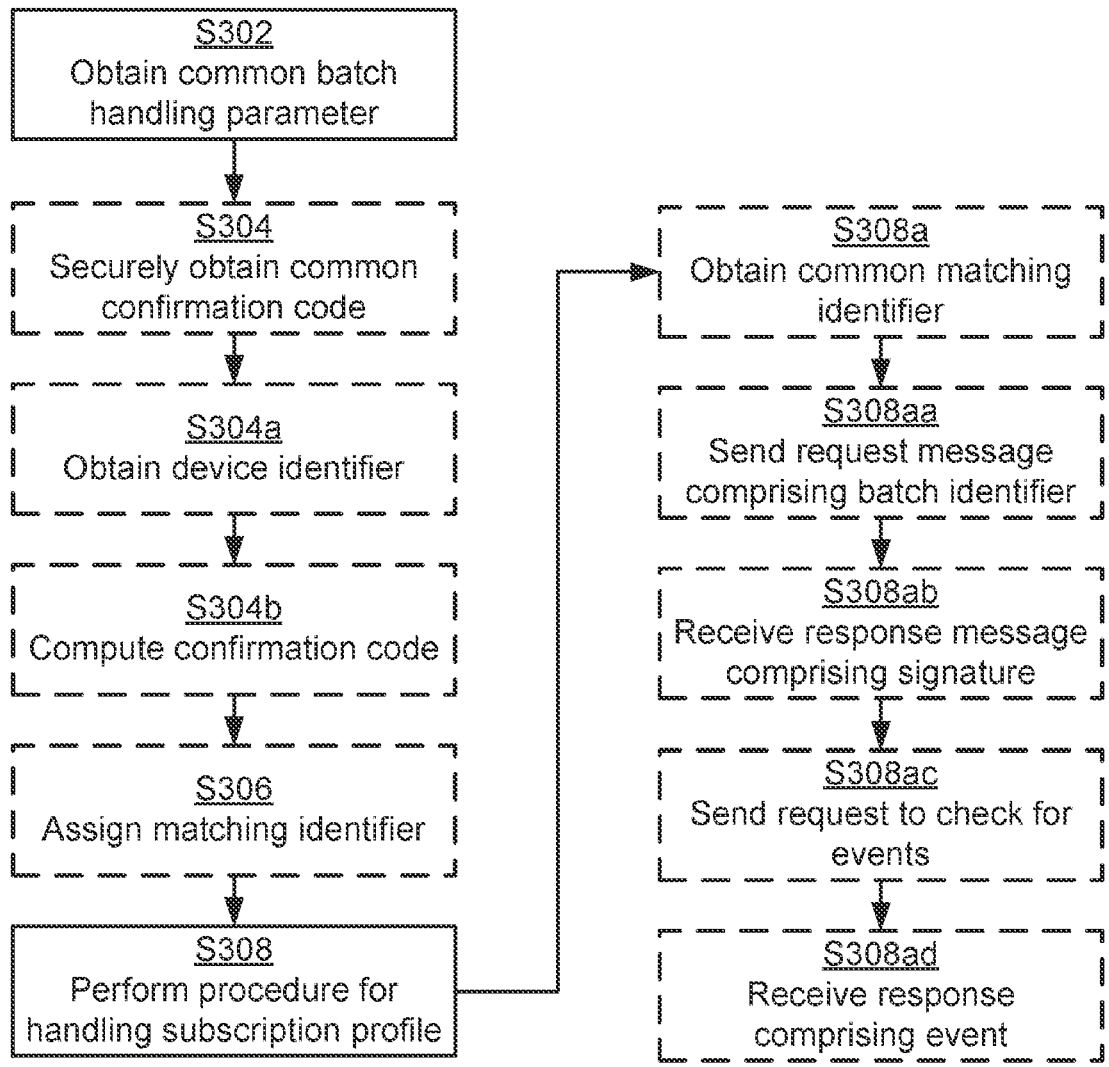

Reference is now made to FIG. 8 illustrating a method for handling subscription profiles for a set of wireless devices 500a, 500b, . . . , 500N as performed by the profile management entity 400 according to an embodiment.

S302: The profile management entity 400 obtains a common batch profile handling parameter for the set of wireless devices 500a, 500b, . . . , 500N.

S308: The profile management entity 400 performs, with the profile provisioning server 300 and one of the wireless devices 500a, 500b, . . . , 500N, a procedure for handling the subscription profile of the wireless device 500a. During this procedure the profile management entity 400 provides to the wireless device 500a a message comprising the batch profile handling parameter and/or a matching identifier for tracking actions relating to the handling of the subscription profiles at the MNO entity 200 and the profile provisioning server 300. Upon receiving the message the wireless device 500a provides to the profile provisioning server 300 a message comprising the matching identifier as signed by the wireless device 500a.

Embodiments relating to further details of handling subscription profiles for a set of wireless devices 500a, 500b, . . . , 500N as performed by the profile management entity 400 will now be disclosed.

As disclosed above, according to some examples the MNO entity 200 selects a common confirmation code for the set of wireless devices 500a, 500b, . . . , 500N. Hence, the profile management entity 400 might be configured to perform step S304:

S304 (optional): The profile management entity 400 securely obtains, from the MNO entity 200, a common confirmation code for the set of wireless devices 500a, 500b, . . . , 500N.

According to some examples, in the full LPAd case, the profile management entity 400 delivers to each wireless device 500a, 500b, . . . , 500N in the set of wireless devices 500a, 500b, . . . , 500N, the common confirmation code. The common confirmation code might, for example, be provided along with the batch handling parameter in the message provided by the profile management entity 400 to the wireless device 500a in step S308.

According to some examples, in the full LPAd case, the profile management entity 400 can be configured to deliver to each wireless device 500a, 500b, . . . , 500N in the set of wireless devices 500a, 500b, . . . , 500N a device specific confirmation code.

Hence, the profile management entity 400 might be configured to perform steps S304a-S304b:

S304a (optional): The profile management entity 400 obtains, from the wireless device 500a, a device identifier for the wireless device 500a.

S304b (optional): The profile management entity 400 computes the confirmation code for the wireless device 500a. The confirmation code for the wireless device 500a is computed as the hash of the common confirmation code and the device identifier for the wireless device 500a.

The profile management entity 400 provides, to the wireless device 500a, the device specific confirmation code for the wireless device 500a. The device specific confirmation code might, for example, be provided along with the batch handling parameter in the message provided by the profile management entity 400 to the wireless device 500a in step S308.

As disclosed above, according to some examples the batch profile handling parameter comprises a batch identifier generated by the MNO entity 200.

The profile management entity 400 might obtain the batch identifier from the MNO entity 200.

As disclosed above, according to some examples the batch identifier is used as device identifier during registration of an event with the SM-DS.

If an SM-DS event is used, a wireless device 500a with a LPAd might obtain the event using the BID. The wireless device 500a then extracts the event identifier for use as the matching identifier. Therefore, according to some examples the batch identifier is provided, by the profile management entity 400, to each wireless device 500a in the set of wireless devices 500a, 500b, . . . , 500N.

If an SM-DS event is used, the profile management entity 400 might, in the LPAd split case, obtain the event using the BID, extract the event identifier and provide it to each wireless device 500a as the common matching identifier. Particularly, in some examples the profile management entity 400 is configured to perform step S308a as part of step S308:

S308a (optional): The profile management entity 400 obtains the common matching identifier to be provided in a message to each wireless device 500a for use in the procedure for handling the subscription profile at the wireless device 500a.

The profile management entity 400 might perform with a first wireless device 500a of the set of wireless devices 500a, 500b, . . . , 500N that registers with the profile management entity 400 steps S308aa and S308ab and with the SM-DS steps S308ac and S308ad as part of step S308a:

S308aa (optional): The profile management entity 400 sends, to the first wireless device 500a, a request message comprising the batch identifier.

S308ab (optional): The profile management entity 400 receives, from the first wireless device 500a, a response message comprising a signature computed over the batch identifier, and the device identifier.

S308*ac* (optional): The profile management entity 400 sends, to the SM-DS, a request to check for events at the SM-DS that are valid for the first wireless device 500*a* and valid for the set of wireless devices 500*a*, 500*b*, . . . , 500N identified by the batch identifier. The request comprises the batch identifier, the signature computed over the batch identifier, and the device identifier.

S308*ad* (optional): The profile management entity 400 receives, from the SM-DS, a response comprising an event and checking that the event matches the intended profile handling procedure. The profile management entity 400 extracts the event identifier for use as the matching identifier.

As disclosed above, according to some examples the batch profile handling parameter comprises an activation code for the set of wireless devices 500*a*, 500*b*, . . . , 500N generated by the MNO entity 200.

The profile management entity 400 might obtain the activation code from the MNO entity 200.

If an AC is used, the AC might be obtained by the profile management entity 400, where the LPApr is provided in the profile management entity 400. Thus, as disclosed above, according to some examples the activation code comprises a common matching identifier, and the matching identifier is used in the procedure for profile handling for each wireless device 500*a* in the set of wireless devices 500*a*, 500*b*, . . . , 500N.

As disclosed above, according to some examples the activation code comprises a range of matching identifiers. The profile management entity 400 might then be configured to perform (optional) step S322:

S306 (optional): The profile management entity 400 assigns one matching identifier from the range of matching identifiers per wireless device 500*a* from the set of wireless devices 500*a*, 500*b*, . . . , 500N, such that each wireless device 500*a* in the set of wireless devices 500*a*, 500*b*, . . . , 500N uses a unique matching identifier in the procedure for profile handling.

If an AC is used, the AC might be obtained by the profile management entity 400, where the complete LPAd is provided in the wireless device 500*a*. Thus, as disclosed above, according to some examples the activation code comprises a common matching identifier. The profile management entity 400 might then forward, to each wireless device 500*a* in the set of wireless devices 500*a*, 500*b*, . . . , 500N, the activation code. The activation code is then comprised in the message provided from the profile management entity 400 to the wireless device 500*a* in step S308.

Further, in the case where the activation code comprises a range of matching identifiers the profile management entity 400 might be configured to perform step S306 to select a unique matching identifier for each wireless device 500*a* from the set of wireless devices 500*a*, 500*b*, . . . , 500N and forward the activation code and the matching identifier to the wireless device 500*a*.

The activation code and the selected matching identifier are typically part of the message provided by the profile management entity 400 to the wireless device 500*a* in step S308.

Figure 9:
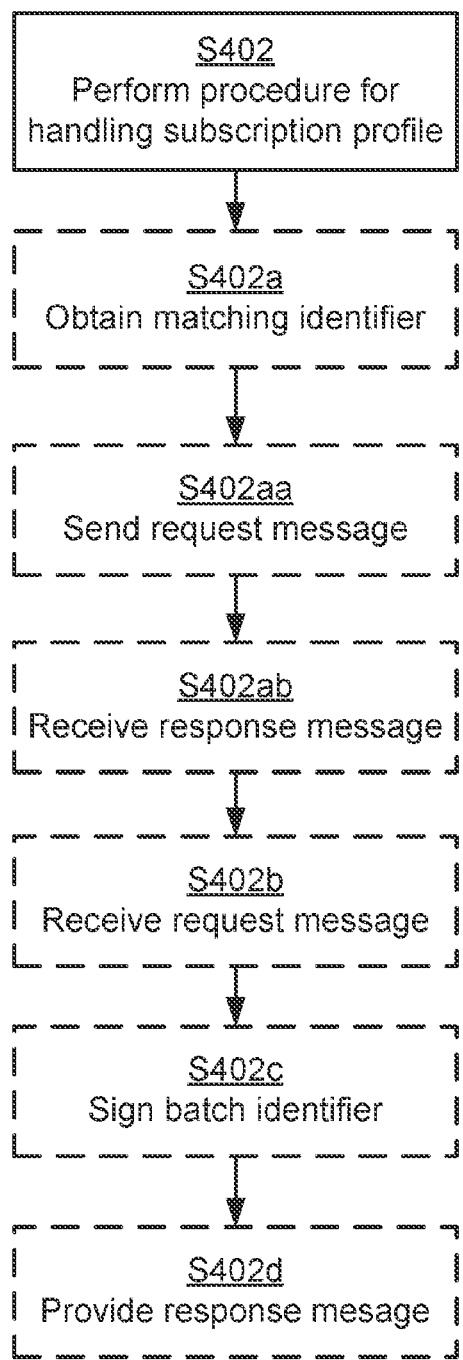

Reference is now made to FIG. 9 illustrating a method for handling a subscription profile for a wireless device 500*a* as performed by the wireless device 500*a* according to an embodiment.

S402: The wireless device 500*a* performs, with the profile management entity 400 and a profile provisioning server 300, a procedure for handling the subscription profile of the wireless device 500*a*. During this procedure the wireless device 500*a* obtains from the profile management entity 400 a message comprising a batch profile handling parameter and/or a matching identifier. The batch profile handling parameter is common for a set of wireless devices 500*a*, 500*b*, . . . , 500N to which the wireless device 500*a* belongs. The set of wireless devices 500*a*, 500*b*, . . . , 500N are associated with at least one matching identifier for tracking actions relating to the handling of the subscription profiles at an MNO entity 200 and the profile provisioning server 300. Upon receiving the message, the wireless device 500*a* provides to the profile provisioning server 300 a message comprising the matching identifier as signed by the wireless device 500*a*.

Embodiments relating to further details of handling a subscription profile for a wireless device 500*a* as performed by the wireless device 500*a* will now be disclosed.

As disclosed above, according to some examples, the handling pertains to subscription download to the set of wireless devices 500*a*, 500*b*, . . . , 500N.

As disclosed above, according to some examples, the handling pertains to remote profile management of the set of wireless devices 500*a*, 500*b*, . . . , 500N.

As disclosed above, according to some examples the set of wireless devices 500*a*, 500*b*, . . . , 500N are bound to a common batch profile handling parameter.

As disclosed above, according to some examples there is one single matching identifier common for all of the wireless devices 500*a*, 500*b*, . . . , 500N in the set of wireless devices 500*a*, 500*b*, . . . , 500N, or one range of matching identifiers for the set of wireless devices 500*a*, 500*b*, . . . , 500N.

As disclosed above, according to some examples a common confirmation code is selected for the set of wireless devices 500*a*, 500*b*, . . . , 500N.

As disclosed above, according to some examples the profile provisioning server 300 verifies the hashed Confirmation Code as unique per wireless device 500*a*, 500*b*, . . . , 500N. The wireless device 500*a*, when having an LPAd, might then be configured to provide, to the profile provisioning server 300, a hash of the confirmation code to the profile provisioning server 300 as part of the procedure for handling the subscription profile of the wireless device 500*a*.

As disclosed above, according to some examples the batch profile handling parameter comprises a batch identifier generated by the MNO entity 200 as part of performing the preparation procedure.

As disclosed above, according to some examples the batch identifier is used as device identifier during registration with the SM-DS of an event of the handling of the subscription profiles.

As disclosed above, if an SM-DS event is used, a wireless device 500*a* with a LPAd might obtain the event using the BID. Thus, according to some examples the batch identifier is obtained from the profile management entity 400. The procedure for handling the subscription profile at the wireless device 500*a* might then involve the wireless device 500*a* to perform step S402*a*:

S402*a* (optional): The wireless device 500*a* obtains the matching identifier for use when sending a message to the profile provisioning server 300 by performing steps S402*aa* and S402*ab*:

S402*aa* (optional): The wireless device 500*a* sends, to the SM-DS, a request message to check for events at the SM-DS that are valid for the wireless device 500*a* and valid for the set of wireless devices 500*a*, 500*b*, . . . , 500N identified by the batch identifier. The request comprises the batch identifier, a signature computed over the batch identifier, and the device identifier.

S402ab (optional): The wireless device 500a receives, from the SM-DS, a response message comprising an event, whereupon the wireless device 500a checks that the event matches the profile handling procedure, and extracts the event identifier for use as the matching identifier.

As disclosed above, if an SM-DS event is used, a wireless device 500a might, in the LPAd split case, aid the profile management entity 400 in obtaining the event using the BID.

If an SM-DS event is used, the batch identifier might be signed by the wireless device 500a for subsequent use when obtaining the event using the batch identifier in the LPAd split case. Hence, in some examples the wireless device 500a is configured to perform steps S402b-S402d:

S402b (optional): The wireless device 500a receives a request message comprising the batch identifier. Upon receiving this message the wireless device 500a performs steps S402c and S402d:

S402c (optional): The wireless device 500a signs the batch identifier.

S402d (optional): The wireless device 500a provides a response message comprising the signature computed over the batch identifier, and the device identifier.

As disclosed above, according to some examples the batch profile handling parameter comprises an activation code for the set of wireless devices 500a, 500b, . . . , 500N generated by the MNO entity 200.

As disclosed above, if an AC is used, the AC might be obtained by the profile management entity 400, where the LPApr is provided in the profile management entity 400. Thus, as disclosed above, according to some examples the activation code comprises a common matching identifier, and the matching identifier is used in the procedure for profile handling for each wireless device 500a in the set of wireless devices 500a, 500b, . . . , 500N.

As disclosed above, according to some examples the activation code comprises a range of matching identifiers, and wherein one matching identifier from the range of matching identifiers is assigned per wireless device 500a from the set of wireless devices 500a, 500b, . . . , 500N, such that each wireless device 500a in the set of wireless devices 500a, 500b, . . . , 500N uses a unique matching identifier in the procedure for profile handling.

As disclosed above, if an AC is used, the AC might be obtained by the profile management entity 400, where the complete LPAd is provided in the wireless device 500a. Thus, as disclosed above, according to some examples the activation code comprises a common matching identifier. The wireless device 500a might then obtain, from the profile management entity 400, the activation code. The activation code is then comprised in the message obtained by the wireless device 500a from the profile management entity 400 in step S402.

As disclosed above, according to some examples the activation code comprises a range of matching identifiers. The wireless device 500a might then obtain, from the profile management entity 400, the activation code and a matching identifier selected by the profile management entity 400. The activation code and matching identifier are then comprised in the message obtained by the wireless device 500a from the profile management entity 400 in step S402.

According to some examples the activation code comprises a common matching identifier for the set of wireless devices 500a, 500b, . . . , 500N, and the common matching identifier is the batch identifier. That is, in some examples where the activation code is used, the Matching identifier is the BID.

Profile Download Preparation

Figure 10:
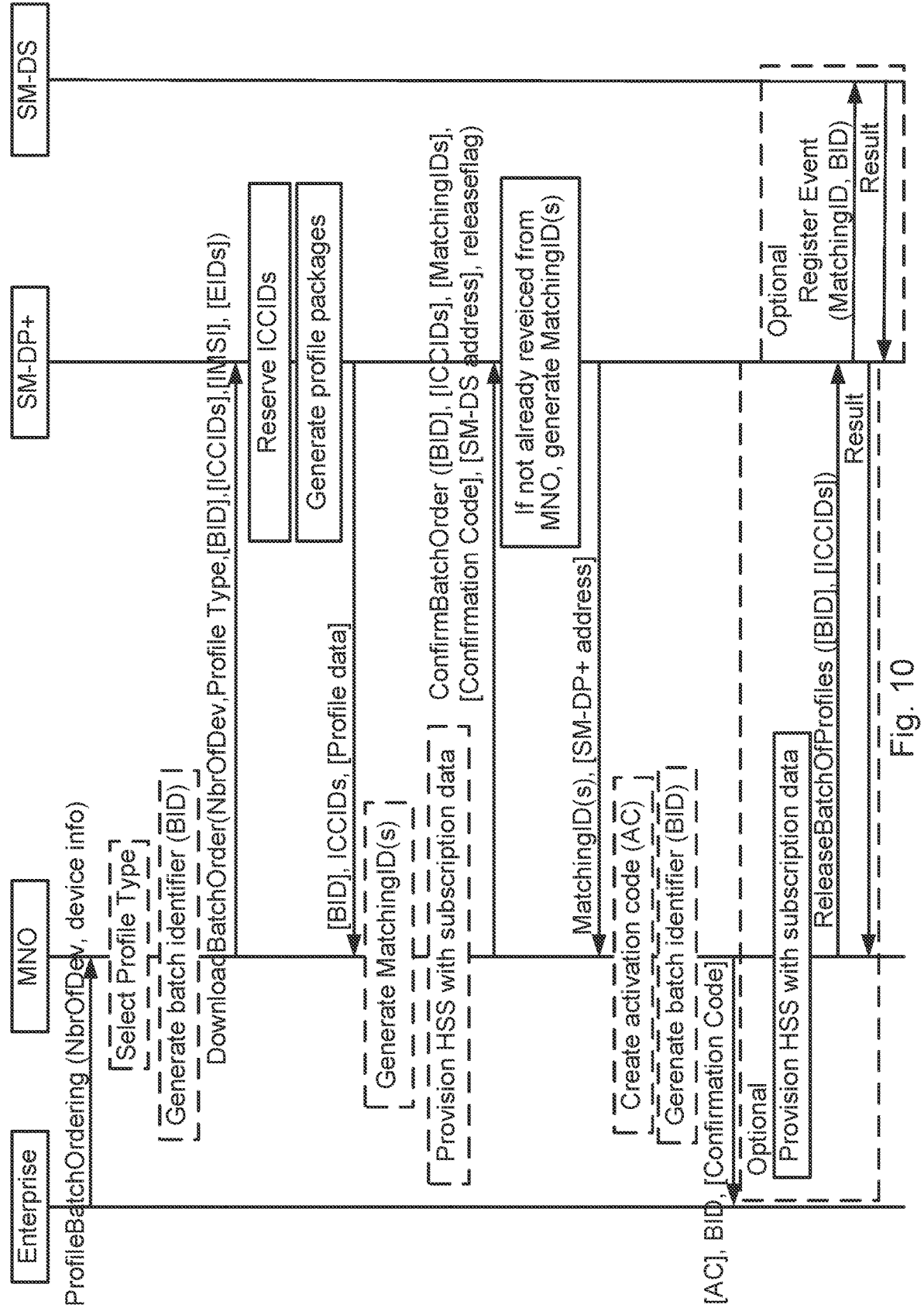

Details of the profile download preparations will now be disclosed with reference to the signalling diagram of FIG. 10.

According to the herein disclosed embodiments the GSMA RSP specification valid for a single wireless device 500a, 500b, . . . , 500N is extended to, at one time, handle a set of wireless devices 500a, 500b, . . . , 500N.

The enterprise requests 3GPP identities (and order subscriptions) for a set of wireless devices 500a, 500b, . . . , 500N from the MNO entity 200 (message: "ProfileBatchOrdering (NbrOfDev, device info)"). The enterprise provides information about the wireless devices 500a, 500b, . . . , 500N. The information could pertain to the number of wireless devices 500a, 500b, . . . , 500N and the type of wireless devices 500a, 500b, . . . , 500N (e.g. if the wireless devices 500a, 500b, . . . , 500N are constrained and what type of connectivity they support). The enterprise may also specify the information on the requested profile. If device identifiers, such as EID and/or IMEI, are available to the enterprise they may also be specified. Based on the information from the enterprise the MNO entity 200 selects a profile type (procedure: "Select Profile Type"). The MNO entity 200 may also at this point generate a batch identifier (procedure: "Generate batch identifier (BID)"). The batch identifier is an identifier for use by the enterprise to identify the set of wireless devices 500a, 500b, . . . , 500N and may also be used between the MNO entity 200 SM-DP+ 300 during the batch ordering procedure. Alternatively, two different batch identifiers may be used for these two different purposes.

The MNO entity 200 places a batch download order (message: "DownloadBatchOrder (NbrOfDev, Profile Type, [BID], [ICCIDs], [IMSIs], [IEDs])") at the SM-DP+ 300. The MNO entity 200 provides the number of wireless device 500a, 500b, . . . , 500N and the profile type in the request, and might also provide EIDs, if available from the enterprise, BID, if generated by the MNO entity 200, IMSI range for the profiles, if not already known to SM-DP+ 300, and ICCID list or range. If the MNO entity 200 provides ICCID values then the first value in ICCID list/range might be associated with the first value in the EID list/range if it is provided.

The request is processed at the SM-DP+ 300 (procedure: "Reserve ICCIDs"). If a list or range of ICCID values is provided, the SM-DP+ 300 checks in its inventory if these ICCID values are available. If not, or if no ICCID values are provided by the MNO entity 200, the SM-DP+ 300 reserves available ICCID values from its inventory. The SM-DP+ 300 then generates the profile packages to be sent to the wireless devices 500a, 500b, . . . , 500N containing the profile data (procedure: "Generate profile packages"). A profile package template based on the profile type is typically used that is then populated with profile individual data such as ICCID, IMSI, subscriber key, personal identification (PIN) code, and personal unlocking key (PUK) code. IMSI values from the MNO entity 200 as used when generating the profile packages are either obtained in the request or are already available to the SM-DP+ 300. If IMSI values are known to the SM-DP+ 300 ahead of the DownloadBatchOrder request then a set of profile packages may also have been pre-generated and stored in the SM-DP+ 300 database. The SM-DP+ 300 can in this case pick profile packages from its storage, if the profile type is correct.

New entries, one for each profile given by its ICCID, are stored in the database of the SM-DP+ 300 linking together each ICCID with the BID (if available) and an EID value, if such values have been provided. The life-cycle state of each profile entry is set to "allocated" (if EID is not available) or "linked" (if EID is available).

The SM-DP+ 300 responds with the BID (if available in the request) and profile data (message: "[BID], ICCIDs, [Profile data]"). The profile data is relevant individual data such as ICCID, IMSI, subscription key, and PUK for each of the profiles. In case of large batches (such as several thousands) of wireless devices 500a, 500b, . . . , 500N it might take time to generate the all the profile packages (if not already pre-generated) and an option is where a response to the DownloadBatchOrder request is provided with BID and/or ICCID values and there is another request made for fetching profile data that then can be called at a later time when all profile packages have been generated.

Upon receiving the response from the SM-DP+ 300 the MNO entity 200 may generate Matching identifier(s) (procedure: "Generate Matching identifier(s)"). In one embodiment a common Matching identifier is used for the complete set of wireless devices 500a, 500b, . . . , 500N. In another embodiment a range of Matching identifiers are allocated, one for each profile download. Once profile data is obtained from the SM-DP+ 300 the MNO entity 200 may provision its HSS (or HLR/AuC) with profile data (e.g. IMSI and subscriber key) such that the profiles are ready for use (procedure: "Provision HSS with subscription data").

The MNO entity 200 confirms the batch order request to confirm the profile download orders (message: "ConfirmBatchOrder ([BID], [ICCIDs], [EIDs], [Matching identifier(s)], [Confirmation Code], [SM-DS address], releaseflag)"). The MNO entity 200 may include the batch identifier in the request to identify the set of profiles at the SM-DP+ 300. If no BID is available, the ICCID list/range is included. If Matching identifier(s) have been generated they are included as well. The EID values may be included here instead and a common confirmation code for the whole set of wireless devices 500a, 500b, . . . , 500N and the SM-DS address if the SM-DS event mechanism is to be used. A release flag is also included indicating whether the profiles are ready to be released (HSS provisioning has been done and the profiles are ready for download) or not.

If not already received from the MNO entity 200, or if the values received are not available, the SM-DP+ 300 selects a common Matching identifier or a range of Matching identifiers, depending on the embodiment (procedure: "Generate Matching identifier(s)"). The SM-DP+ 300 then populates the profile database entries related to the batch with Matching identifier(s) and EIDs and Confirmation Code, if provided. If the release flag is set to true, the life-cycle state of each profile is set to released. If the release flag is set to false, the life-cycle state may be updated to "linked" if EID values are provided. The selected Matching identifier(s) and SM-DP+ address (optional) is returned in response to the MNO entity 200 (message: "Matching identifier(s), [SM-DP+ address]").

The MNO entity 200 might then generate the activation code (AC) (procedure: "Create Activation Code (AC)"). If one common Matching identifier is used for the whole set of wireless devices 500a, 500b, . . . , 500N then the standard format as described in the GSMA RSP specification is reused. If one Matching identifier per wireless device 500a, 500b, . . . , 500N is used and a sequential range of Matching identifier values have been allocated then the standard AC format is extended with the number of wireless devices 500a, 500b, . . . , 500N in the set. For example, the number of wireless devices 500a, 500b, . . . , 500N might follow after the Matching identifier with the delimiter "$" in between:

Example: 1$SMDP.EXAMPLE.COM$04386-AGYFT-A74Y8-3F815$1000$1.3.6.1.4.1.31746$1

If not already generated, the MNO entity 200 also generates a BID (procedure: "Generate batch identifier (BID)"). The MNO entity 200 then returns the AC and/or the batch identifier to the enterprise as part of finalizing the subscription (profile ordering) contract (message: "[AC], BID, [Confirmation Code]").

In one alternative the common Matching identifier is chosen to be the BID value. This could be the case when using the Activation Code for triggering profile download and where the LPApr/LPAd can extract the BID from the AC for later use with the SM-DS mechanism for checking for events for download of RPM operations.

If HSS provisioning has not already been performed, the MNO entity 200 might send a request to the SM-DP+ 300 once the provisioning has been performed such that the SM-DP+ 300 can set the profiles in state "released" (procedure: "Provision HSS with subscription data", messages: "ReleaseBatchOfProfiles ([BID], [ICCIDs])", "Result"). If release status was already confirmed in ConfirmBatchOrder then this step can be omitted.

If the SM-DS event mechanism is to be used to trigger profile download then the event registration is performed (messages: "Register Event (Matching identifier, BID)", "Result"). Consider the case of a common Matching identifier for the whole set of wireless devices 500a, 500b, . . . , 500N. Event registration can be performed where the Matching identifier is used as EventID and the batch identifier is used as identifier (instead of the EID). The event becomes a common event for use by all the wireless devices 500a, 500b, . . . , 500N in the set and will not be removed by the SM-DP+ 300 until all profiles in the set have been downloaded. This mechanism can be used independently if the EID values are known or not. The alternative with one matching identifier per wireless device 500a, 500b, . . . , 500N in the set should not be used with SM-DS registration mechanism unless the EID values are known for each wireless device 500a, 500b, . . . , 500N. In this case the known event registration mechanisms can be used and one event per wireless device 500a, 500b, . . . , 500N is registered with its EID and corresponding Matching identifier from the SM-DP+ 300 database.

The set up for the SM-DS can be global with multiple SM-DP+ providers sharing the same SM-DS. The BID might then be needed to be unique for such cases. Since the BID is generated by the MNO entity 200 the BID can be composed of a random number and a prefix value unique per MNO entity 200. The 32-digit EID format may be used also for the BID with some modifications to prevent the BID to collide with an existing EID value and to be globally unique. For example, one or more country code as encoded by digits 3 to 5 may be reserved for BIDs. To make each BID globally unique, digits 6 to 8 and digits 9 to 11 may encode the mobile country code (MCC) and mobile network code (MNC) of the MNO entity 200 that generated the BID. This leaves digits 12 to 30 for the random number (digits 31 and 32 are checksum digits).

Preparation for RPM Operation

Figure 11:
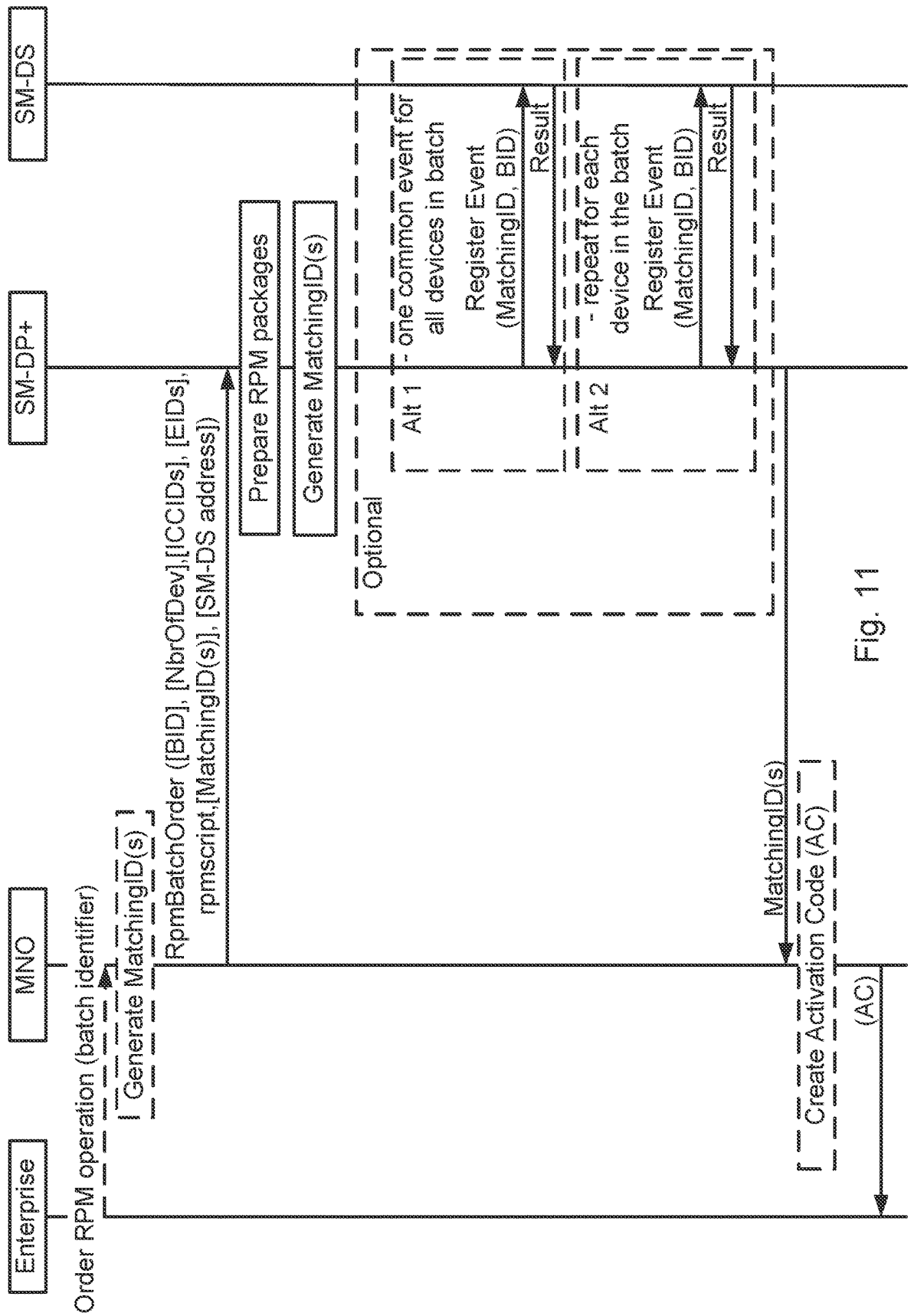

Details of the preparations for RPM operation will now be disclosed with reference to the signalling diagram of FIG. 11.

As described above, either the enterprise or the MNO entity 200 itself can cause one or more RPM operation to be ordered (message: "Order RPM operation (batch identifier)"). The MNO entity 200 may generate Matching identifier(s) for the RPM operation(s) to be used with the SM-DP+ 300 (procedure: "Generate Matching identifiers)"). In one alternative a common Matching identifier is used for the complete set of wireless devices 500a, 500b, . . . , 500N. In another alternative a range of Matching identifiers is allocated, one for each wireless device 500a, 500b, . . . , 500N in the set. The MNO entity 200 orders one or more RPM operations for the set of wireless devices 500a, 500b, . . . , 500N from the SM-DP+ 300 (message: "Rpm-BatchOrder ([BID], [NbrOfDev], [ICCIDs], [EIDs], rpmscript, [Matching identifier(s)], [SM-DS address])"). In the request the MNO entity 200 provides an RPM script containing RPM commands (or operations) to be performed. The MNO entity 200 also provides the ICCID values of the profiles upon which the RPM commands shall be performed, the EID values of the wireless devices 500a, 500b, . . . , 500N, and the number of wireless devices 500a, 500b, . . . , 500N, unless this is already known to the SM-DP+ 300 from an optional BID provided by the MNO entity 200. This is then the same BID that has been used either for profile download or a previous RPM operation and is available in the SM-DP+ 300 database and linked to ICCIDs and EIDs for the set of wireless devices 500a, 500b, . . . , 500N. The MNO entity 200 may also provide the Matching identifier(s) (if available) and the SM-DS address (if SM-DS event mechanism is to be used).

The SM-DP+ 300 prepares the RPM packages for each of the wireless devices 500a, 500b, . . . , 500N in the set using the provided (template) RPM script and inserting the ICCID value matching to each wireless device 500a, 500b, . . . , 500N (procedure: "Prepare RPM packages"). If not already received from the MNO entity 200, or if the values received are not available, the SM-DP+ 300 selects a common Matching identifier or a range of Matching identifiers, depending on the embodiment (procedure: "Generate matching identifier(s)"). The SM-DP+ 300 then populates the profile database entries related to the set of wireless devices 500a, 500b, . . . , 500N with Matching identifier(s), EIDs, and the RPM packages.

If SM-DS event mechanism is to be used to trigger RPM operations to be executed then event registration is performed. Two alternatives are possible (ALT 1 messages: "Register Event (Matching identifier, BID)" and "Result" or ALT 2 messages: "Register Event (Matching identifier_i, EID), Result"). In the case of a common Matching identifier for the whole set of wireless devices 500a, 500b, . . . , 500N, the Matching identifier is used as EventID and the BID is used as identifier (instead of the EID). The event becomes a common event for use by all wireless devices 500a, 500b, . . . , 500N in the set and will not be removed by the SM-DP+ 300 until all profiles in the set of wireless devices 500a, 500b, . . . , 500N have been downloaded. In the case with one Matching identifier per wireless device 500a, 500b, . . . , 500N in the set then standard event registration mechanism can be used and one event per wireless device 500a, 500b, . . . , 500N is registered with its EID and corresponding Matching identifier from the SM-DP+ database (message: "Matching identifier(s)", procedure: "Create Activation Code (AC)", message: "[AC]"). This latter alternative may be used also when a common matching identifier is used.

Profile Download and Installation

Details of profile download and installation will now be disclosed.

Before any profile download is performed it is here for illustrative purposes assumed that the database of the profile provisioning server 200 holds as many profile entries as the number of wireless devices 500a, 500b, . . . , 500N in the set and where all profile entries are mapped to the common matching identifier and are all in life-cycle state "released". The EID values are not yet known and not present in the profile entries in the database.

Profile download is triggered when a wireless device 500a registers with the profile management entity. In the LPAd split case, the profile management entity starts the profile download (in the case an activation code is available) or checks for an SM-DS event for profile download using the batch identifier (BID). In the case of a wireless device 500a with LPAd, the wireless device 500a is configured by the management server with an activation code or BID as part of device configuration. Depending on this configuration, the wireless device 500a will either check for an SM-DS event for profile download to obtain the matching identifier or directly start profile download using the matching identifier from the activation code. The SM-DS event mechanism is described in more detail below. In the LPAd split case the SM-DS event retrieval only has to be done once (for the first wireless device 500a that registers with the profile management entity) to obtain the common matching identifier.

The procedure for profile download between each wireless device 500a and the profile provisioning server 200 follows the standard GSMA RSP protocol for profile download, with modifications and via the profile management entity 300 in the LPAd split case, using the common matching identifier. In this procedure the matching identifier is signed by the wireless device 500a, linking the matching identifier to the EID (in an AuthenticateServerResponse message). The profile provisioning server 200 checks whether there is an available profile for download for the given wireless device 500a by examining the matching identifier and EID. The profile provisioning server 200 searches for profile entries in "released" state with the received matching identifier. If no entry is available an error is generated and the profile download request is rejected. If one or more such entries are present then it is checked if one of these entries is already mapped to the received EID. If this is the case, the profile provisioning server 200 assumes it is an ongoing profile download session that went wrong (i.e. was interrupted) the previous time and a new attempt is now made. The selected profile entry is then chosen, and profile download continues. If there is no entry already mapped to this EID, but entries that are not already mapped to an EID are available, then it is checked by the profile provisioning server 200 that this EID has not already been used once to download a profile for the given set of wireless devices 500a, 500b, . . . , 500N. This can be achieved by searching for profile entries in state "installed" matching the matching identifier and EID values. If such an entry is found, an error is generated and the profile download request is rejected. If not, then a profile entry in released state with the corresponding matching identifier is selected for the profile download and the EID value is assigned to this profile entry in the profile provisioning server 200 database.

In the example where a range of matching IDs are used inside a common AC, it is the profile management entity 300 that ensures that the matching identifier is unique in the profile download for each wireless device 500a. The checks performed by the profile provisioning server 200 as described (to ensure each wireless device 500a receives a unique profile and that a wireless device 500a can only download one profile per batch) above are valid also in this case.

Download and Execution of RPM Operations

Details of download and execution of RPM operations will now be disclosed.

Before any download and execution of RPM operations is performed it is here for illustrative purposes assumed that the profile provisioning server 200 database includes as many profile entries as the number of wireless devices 500a, 500b, ..., 500N in the set and that each profile entry is mapped to a Matching identifier (either the common Matching identifier or a unique Matching identifier from the range of Matching identifiers), is in life-cycle state "installed", is associated with an RPM package for download, and is mapped to the EID value of the iUICC/eUICC where the profile resides.

In some examples the SM-DS event mechanism is used to trigger download of RPM operations, and the LPApr or LPAd is configured with the common BID for the whole set of wireless devices 500a, 500b, ..., 500N and periodically checks for events. Alternatively, the EID may be used to check for events. In the LPAd split case, if a common Matching identifier is used then it is enough to perform the check for events only when the first wireless device 500a belonging to the set registers. With the BID a common Matching identifier is used, but when the EID is used the Matching identifier may be common for all wireless devices 500a, 500b, ..., 500N in the set or not. In case of different Matching identifiers then the LPApr should check for events for all the wireless devices 500a, 500b, ..., 500N in the set.

If an event indicating RPM download is obtained, the LPApr/LPAd triggers download and execution of an RPM package. Alternatively, download and execution of an RPM package can be triggered through an Activation Code valid for the whole set of wireless devices 500a, 500b, ..., 500N and configured to the profile management entity 400 by the enterprise. The actual download and execution of the RPM package might then be performed according to the GSMA RSP specification and the Matching identifier obtained from the AC or through the SM-DS mechanism (i.e. the EventID) can be used. Since EID values are known to the SM-DP+ 300 at this point the SM-DP+ 300 might use the received Matching identifier (either common Matching identifier for the whole set of wireless devices 500a, 500b, ..., 500N or individual per device) and the EID to locate the correct profile entry in its database and the corresponding RPM package.

Retrieval of Events from SM-DS

Details of how the wireless devices 500a, 500b, ..., 500N might retrieve events from the SM-DS will now be disclosed.

The SM-DS searches for events for an iUICC/eUICC of a wireless device 500a, 500b, ..., 500N based on the EID, which it obtains during common mutual authentication with each wireless device 500a, 500b, ..., 500N. The SM-DS thus searches its database for event records for the given EID. If any events are available, these events are signed using the SM-DS private key and passed to the LPApr/LPAd. The LPApr/LPAd then uses the iUICC/eUICC to verify the SM-DS signature. If the verification is successful the LPApr/LPAd starts to process the list of event records. The following is performed in order to allow an LPApr/LPAd to check for events registered using a common BID. The so-called CtxParams1 field of an AuthenticateServerRequest message prepared by the LPApr/LPAd is extended to include the BID as an optional parameter. The BID is included as part of the CtxParamsForCommonAuthentication in the CtxParams1. The CtxParams1 is signed by the iUICC/eUICC as part of the AuthenticateServerResponse. Upon successful parsing and verification of the AuthenticateServerResponse, if the SM-DS finds a BID included as part of CtxParamsForCommonAuthentication, then the BID is used instead of the extracted EID to search for event records in the SM-DS database. The verification of the AuthenticateServerResponse proves to the SM-DS that the request comes from a wireless device 500a, 500b, ..., 500N equipped with a legitimate iUICC/eUICC. The signature covering also the BID proves to the SM-DS the knowledge of the BID.

The value of the BID should be handled with care by the enterprise, the MNO entity 200, the SM-DP+ 400, and the SM-DS in order to prevent unauthorized access to the BID as well as unauthorized profile download. The BID might therefore be transferred on encrypted links between these entities. For additional security, a Confirmation Code might be used for profile download, thereby preventing unauthorized profile download if the BID value has leaked. In the case of RPM operations there is no need to use a Confirmation Code.

Confirmation Code

Details of the Confirmation Code will now be disclosed.

In general terms, the GSMA RSP consumer variant specification defines the concept of a Confirmation Code that is a secret value transferred out of band from the MNO entity 200 to the device owner/user and that is then provided to the LPApr/LPAd. The Confirmation Code, which is optional, is used to prove to the SM-DP+ 300 that a wireless device 500a, 500b, ..., 500N is authorized for profile download.

In more detail, when the EID values are not known at the SM-DP+ 300 during profile download, any wireless device 500a, 500b, ..., 500N with a legitimate iUICC/eUICC that knows the common Matching identifier (or one of the individual Matching identifiers for the set of wireless device 500a, 500b, ..., 500N if this option is used) can contact the SM-DP+ 300 for profile download. This implies that the Matching identifier(s) should become a secret and be protected when transferred between the SM-DP+ 300, the MNO entity 200, the enterprise, and the SM-DS. Further, the Matching identifier(s) should be securely stored and handled with care at each entity such that it does not leak allowing unauthorized profile downloads. Further, the Matching identifier(s) should be given non-trivial values. For example, the Matching identifier(s) might be given random values. The size of the Matching identifier might be have a length (e.g. at least 10 characters) such that the probability of guessing the correct value is comparatively low. The SM-DP+ 300 might implement limits on the number of attempts for profile download a wireless device 500a, 500b, ..., 500N with a legitimate iUICC/eUICC may perform per minute (using different Matching identifier) and also a maximum number of attempts.

In the case the SM-DS mechanism is utilized with profile download, the BID is used to retrieve the EventID, which then serves as the common Matching identifier. The BID is intended as a long-lived identifier of the set of wireless devices 500a, 500b, ..., 500N throughout its life-time. Any wireless device 500a, 500b, ..., 500N with a legitimate iUICC/eUICC that knows the BID can retrieve the SM-DS events valid for the set of wireless devices 500a, 500b, ..., 500N. If the common Matching identifier is to be kept secret also the BID should be kept secret until profile download has been completed for all wireless devices 500a, 500b, ..., 500N in the set. Hence, where SM-DS event mechanism is used for profile download (and a Confirmation Code is not used) the above details regarding how to keep Matching identifier a secret is also valid for the BID. However, in general terms, the SM-DS event mechanism is not originally designed to handle secrets. The SM-DS event mechanism commonly handles EIDs and EventIDs that are not considered secret. Hence, with the SM-DS event mechanism there is a higher risk that the BID and the common Matching identifier leak compared to the Activation Code option.

For additional security, in some examples a Confirmation Code common for the set of wireless devices 500a, 500b, . . . , 500N is therefore used for profile download. The use of a Confirmation Code prevents unauthorized profile download even if the common Matching identifier and/or BID has leaked. With the use of the Confirmation Code the Matching identifier and the BID do not have to be considered as secrets.

The Confirmation code might be selected by the MNO entity 200 and securely provided to the enterprise and the SM-DP+ 300. The Confirmation Code is provided to the profile management entity 400 (LPApr in the LPAd split case) by the enterprise and might in the LPAd case be obtained by each wireless device 500a, 500b, . . . , 500N from the profile management entity 400 along with the BID and/or AC. According to the GSMA RSP specification the Confirmation Code is hashed with the transaction identifier by the LPAd/LPApr and is then signed by the iUICC/eUICC and provided to the SM-DP+ 300 as part of the so-called PrepareDownloadResponse structure. Upon successful signature verification, the SM-DP+ 300 computes the hash of the Confirmation Code and the transaction identifier and checks that it matches the signed hash.

In the LPAd case, where the Confirmation Code is provided to each wireless device 500a, 500b, . . . , 500N of the set, there might be an increased risk that the Confirmation Code leaks. In an alternative, to prevent the common Confirmation Code to be provided to each wireless device 500a, 500b, . . . , 500N, the Confirmation Code is first hashed with the EID of each wireless device 500a, 500b, . . . , 500N by the profile management entity 400 and this hash is then provided as a device specific secret to each device. The LPAd then uses this hash in place of the ordinary Confirmation Code while performing the profile download. The SM-DP+ 300 is then configured accordingly when verifying the Confirmation Code. That is, the SM-DP+ 300 might first compute the hash of the Confirmation Code and the EID, then compute another hash of this first hash concatenated with the transaction identifier, and then check that the second hash matches what was signed by the iUICC/eUICC. This alternative might also be used also in the LPApr case, even though the Confirmation Code then never leaves LPApr.

Figure 12:
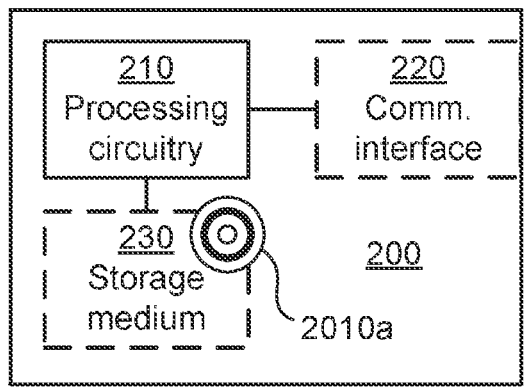
FIG. 12 is a schematic diagram showing functional units of an MNO entity according to an embodiment.

FIG. 12 schematically illustrates, in terms of a number of functional units, the components of an MNO entity 200 according to an embodiment. Processing circuitry 210 is provided using any combination of one or more of a suitable central processing unit CPU, multiprocessor, microcontroller, digital signal processor DSP, etc., capable of executing software instructions stored in a computer program product 2010a as in FIG. 20, e.g. in the form of a storage medium 230. The processing circuitry 210 may further be provided as at least one application specific integrated circuit ASIC, or field programmable gate array FPGA.

Particularly, the processing circuitry 210 is configured to cause the MNO entity 200 to perform a set of operations, or steps, as disclosed above. For example, the storage medium 230 may store the set of operations, and the processing circuitry 210 may be configured to retrieve the set of operations from the storage medium 230 to cause the MNO entity 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The MNO entity 200 may further comprise a communications interface 220 for communications with other entities, nodes, functions, devices, and servers. As such the communications interface 220 may comprise one or more transmitters and receivers, comprising analogue and digital components.

The processing circuitry 210 controls the general operation of the MNO entity 200 e.g. by sending data and control signals to the communications interface 220 and the storage medium 230, by receiving data and reports from the communications interface 220, and by retrieving data and instructions from the storage medium 230. Other components, as well as the related functionality, of the MNO entity 200 are omitted in order not to obscure the concepts presented herein.

Figure 13:
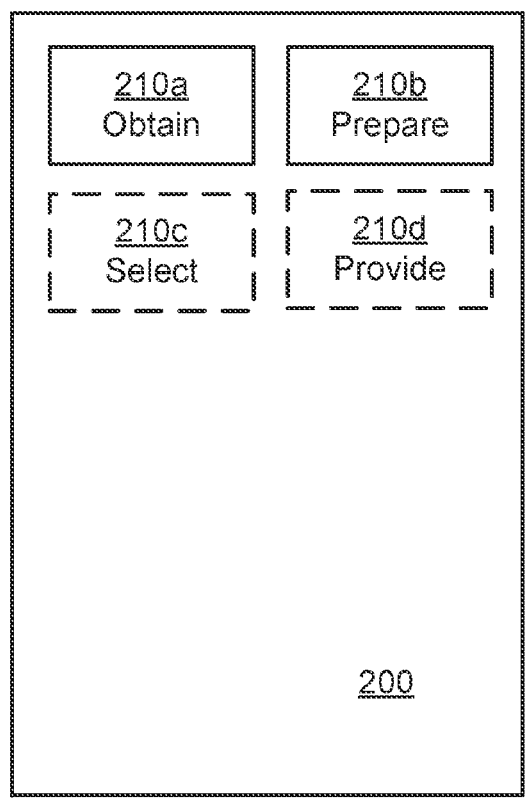
FIG. 13 is a schematic diagram showing functional modules of an MNO entity according to an embodiment.

FIG. 13 schematically illustrates, in terms of a number of functional modules, the components of an MNO entity 200 according to an embodiment. The MNO entity 200 of FIG. 13 comprises a number of functional modules; an obtain module 210a configured to perform step S102, and a prepare module 210b configured to perform step S104. The MNO entity 200 of FIG. 13 may further comprise a number of optional functional modules, such as any of a select module 210c configured to perform step S104a, and a provide module 210d configured to perform step S104b. In general terms, each functional module 210a-210d may be implemented in hardware or in software. Preferably, one or more or all functional modules 210a-210d may be implemented by the processing circuitry 210, possibly in cooperation with the communications interface 220 and the storage medium 230. The processing circuitry 210 may thus be arranged to from the storage medium 230 fetch instructions as provided by a functional module 210a-210d and to execute these instructions, thereby performing any steps of the MNO entity 200 as disclosed herein.

Figure 14:
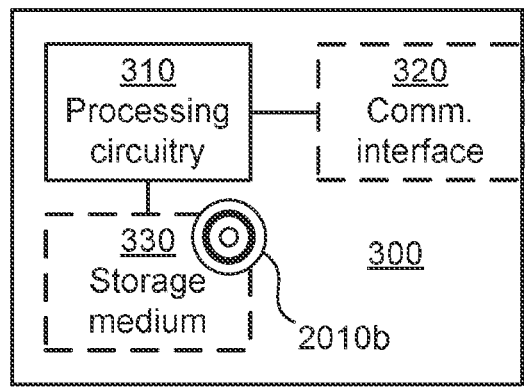
FIG. 14 is a schematic diagram showing functional units of a profile provisioning server according to an embodiment.

FIG. 14 schematically illustrates, in terms of a number of functional units, the components of a profile provisioning server 300 according to an embodiment. Processing circuitry 310 is provided using any combination of one or more of a suitable central processing unit CPU, multiprocessor, microcontroller, digital signal processor DSP, etc., capable of executing software instructions stored in a computer program product 2010b as in FIG. 20, e.g. in the form of a storage medium 330. The processing circuitry 310 may further be provided as at least one application specific integrated circuit ASIC, or field programmable gate array FPGA.

Particularly, the processing circuitry 310 is configured to cause the profile provisioning server 300 to perform a set of operations, or steps, as disclosed above. For example, the storage medium 330 may store the set of operations, and the processing circuitry 310 may be configured to retrieve the set of operations from the storage medium 330 to cause the profile provisioning server 300 to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The profile provisioning server 300 may further comprise a communications interface 320 for communications with other entities, nodes, functions, devices, and servers. As such the communications interface 320 may comprise one or more transmitters and receivers, comprising analogue and digital components.

The processing circuitry 310 controls the general operation of the profile provisioning server 300 e.g. by sending data and control signals to the communications interface 320 and the storage medium 330, by receiving data and reports from the communications interface 320, and by retrieving data and instructions from the storage medium 330. Other components, as well as the related functionality, of the profile provisioning server 300 are omitted in order not to obscure the concepts presented herein.

Figure 15:
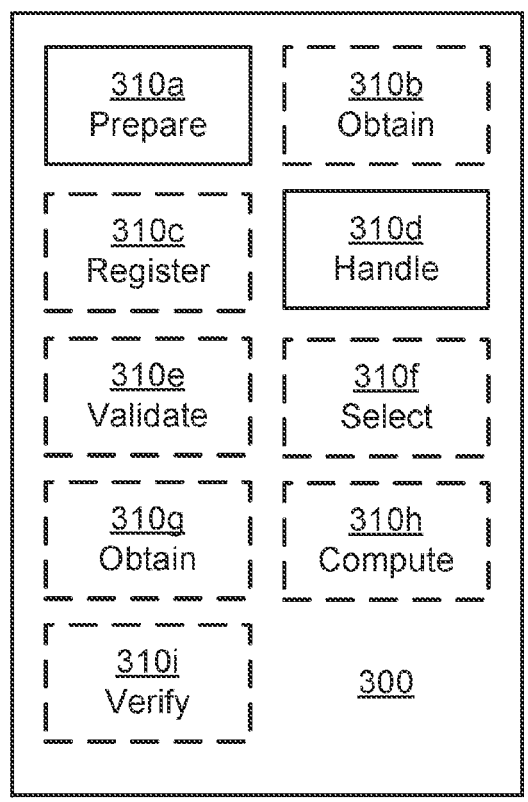
FIG. 15 is a schematic diagram showing functional modules of a profile provisioning server according to an embodiment.

FIG. 15 schematically illustrates, in terms of a number of functional modules, the components of a profile provisioning server 300 according to an embodiment. The profile provisioning server 300 of FIG. 15 comprises a number of functional modules; a prepare module 310a configured to perform step S202, and a handle module 310d configured to perform step S206. The profile provisioning server 300 of FIG. 15 may further comprise a number of optional functional modules, such as any of an obtain module 310b configured to perform step S202a, a register module 310c configured to perform step S204, a validate module 310e configured to perform step S206a, a select module 310f configured to perform step S206b, an obtain module 310g configured to perform step S206a, a compute module 310h configured to perform step S206b, and a verify module 310i configured to perform step S206c.

In general terms, each functional module 310a-310i may be implemented in hardware or in software. Preferably, one or more or all functional modules 310a-310i may be implemented by the processing circuitry 310, possibly in cooperation with the communications interface 320 and the storage medium 330. The processing circuitry 310 may thus be arranged to from the storage medium 330 fetch instructions as provided by a functional module 310a-310i and to execute these instructions, thereby performing any steps of the profile provisioning server 300 as disclosed herein.

Figure 16:
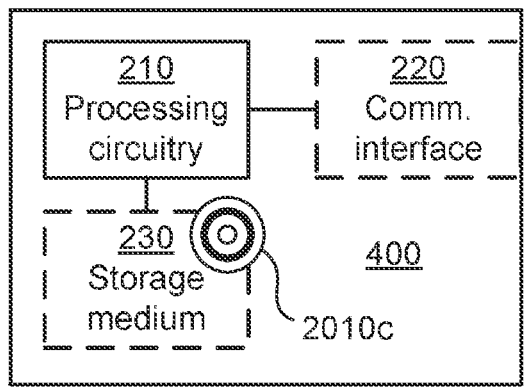
FIG. 16 is a schematic diagram showing functional units of a profile management entity according to an embodiment.

FIG. 16 schematically illustrates, in terms of a number of functional units, the components of a profile management entity 400 according to an embodiment. Processing circuitry 410 is provided using any combination of one or more of a suitable central processing unit CPU, multiprocessor, microcontroller, digital signal processor DSP, etc., capable of executing software instructions stored in a computer program product 2010c as in FIG. 20, e.g. in the form of a storage medium 430. The processing circuitry 410 may further be provided as at least one application specific integrated circuit ASIC, or field programmable gate array FPGA.

Particularly, the processing circuitry 410 is configured to cause the profile management entity 400 to perform a set of operations, or steps, as disclosed above. For example, the storage medium 430 may store the set of operations, and the processing circuitry 410 may be configured to retrieve the set of operations from the storage medium 430 to cause the profile management entity 400 to perform the set of operations. The set of operations may be provided as a set of executable instructions. Thus the processing circuitry 410 is thereby arranged to execute methods as herein disclosed.

The storage medium 330 may also comprise persistent storage, which, for example, can be any single one or combination of magnetic memory, optical memory, solid state memory or even remotely mounted memory.

The profile management entity 400 may further comprise a communications interface 420 for communications with other entities, nodes, functions, devices, and servers. As such the communications interface 420 may comprise one or more transmitters and receivers, comprising analogue and digital components.

The processing circuitry 410 controls the general operation of the profile management entity 400 e.g. by sending data and control signals to the communications interface 420 and the storage medium 430, by receiving data and reports from the communications interface 420, and by retrieving data and instructions from the storage medium 430. Other components, as well as the related functionality, of the profile management entity 400 are omitted in order not to obscure the concepts presented herein.

Figure 17:
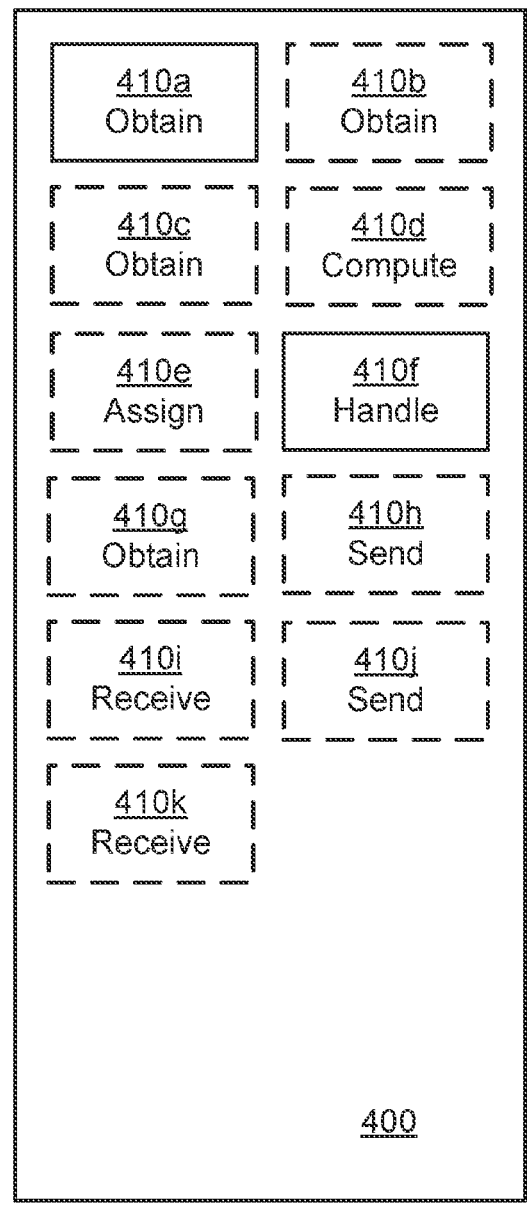
FIG. 17 is a schematic diagram showing functional modules of a profile management entity according to an embodiment.

FIG. 17 schematically illustrates, in terms of a number of functional modules, the components of a profile management entity 400 according to an embodiment. The profile management entity 400 of FIG. 17 comprises a number of functional modules; an obtain module 410a configured to perform step S302, and a handle module 410f configured to perform step S308. The profile management entity 400 of FIG. 17 may further comprise a number of optional functional modules, such as any of an obtain module 410b configured to perform step S304, an obtain module 410c configured to perform step S304a, a compute module 410d configured to perform step S304b, an assign module 410e configured to perform step S306, an obtain module 410g configured to perform step S308a, a send module 410h configured to perform step S308aa, a receive module 410i configured to perform step S308ab, a send module 410j configured to perform step S308ac, and a receive module 410k configured to perform step S308ad.

In general terms, each functional module 410a-410k may be implemented in hardware or in software. Preferably, one or more or all functional modules 410a-410k may be implemented by the processing circuitry 410, possibly in cooperation with the communications interface 420 and the storage medium 430. The processing circuitry 410 may thus be arranged to from the storage medium 430 fetch instructions as provided by a functional module 410a-410k and to execute these instructions, thereby performing any steps of the profile management entity 400 as disclosed herein.

Figure 18:
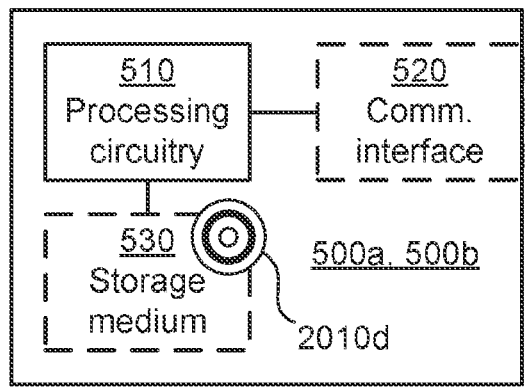
FIG. 18 is a schematic diagram showing functional units of a wireless device according to an embodiment.

FIG. 18 schematically illustrates, in terms of a number of functional units, the components of a wireless device 500a according to an embodiment. Processing circuitry 510 is provided using any combination of one or more of a suitable central processing unit CPU, multiprocessor, microcontroller, digital signal processor DSP, etc., capable of executing software instructions stored in a computer program product 2010c as in FIG. 20, e.g. in the form of a storage medium 530. The processing circuitry 510 may further be provided as at least one application specific integrated circuit ASIC, or field programmable gate array FPGA.

Particularly, the processing circuitry 510 is configured to cause the wireless device 500a to perform a set of operations, or steps, as disclosed above. For example, the storage medium 530 may store the set of operations, and the processing circuitry 510 may be configured to retrieve the set of operations from the storage medium 530 to cause the wireless device 500a to perform the set of operations. The set of operations may be provided as a set of executable instructions. Thus the processing circuitry 510 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 500a may further comprise a communications interface 520 for communications with other entities, nodes, functions, devices, and servers. As such the communications interface 520 may comprise one or more transmitters and receivers, comprising analogue and digital components.

The processing circuitry 510 controls the general operation of the wireless device 500a e.g. by sending data and control signals to the communications interface 520 and the storage medium 530, by receiving data and reports from the communications interface 520, and by retrieving data and instructions from the storage medium 530. Other components, as well as the related functionality, of the wireless device 500a are omitted in order not to obscure the concepts presented herein.

Figure 19:
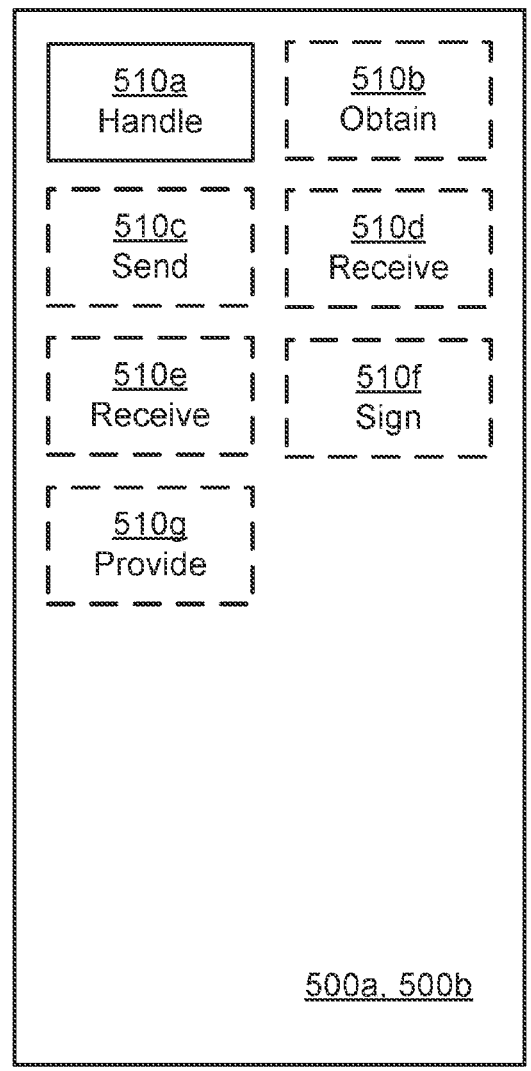
FIG. 19 is a schematic diagram showing functional modules of a wireless device according to an embodiment.

FIG. 19 schematically illustrates, in terms of a number of functional modules, the components of a wireless device 500a according to an embodiment. The wireless device 500a of FIG. 19 comprises a handle module 510a configured to perform step S402. The wireless device 500a of FIG. 19 may further comprise a number of optional functional modules, such as any of an obtain module 510b configured to perform step S402a, a send module 510c configured to perform step S402aa, a receive module 510d configured to perform step S402ab, a receive module 510e configured to perform step S402b, a sign module 510f configured to perform step S402c, and a provide module 510g configured to perform step S402d.

In general terms, each functional module 510a-510g may be implemented in hardware or in software. Preferably, one or more or all functional modules 510a-510g may be implemented by the processing circuitry 510, possibly in cooperation with the communications interface 520 and the storage medium 530. The processing circuitry 510 may thus be arranged to from the storage medium 530 fetch instructions as provided by a functional module 510a-510g and to execute these instructions, thereby performing any steps of the wireless device 500a as disclosed herein.

Figure 1:
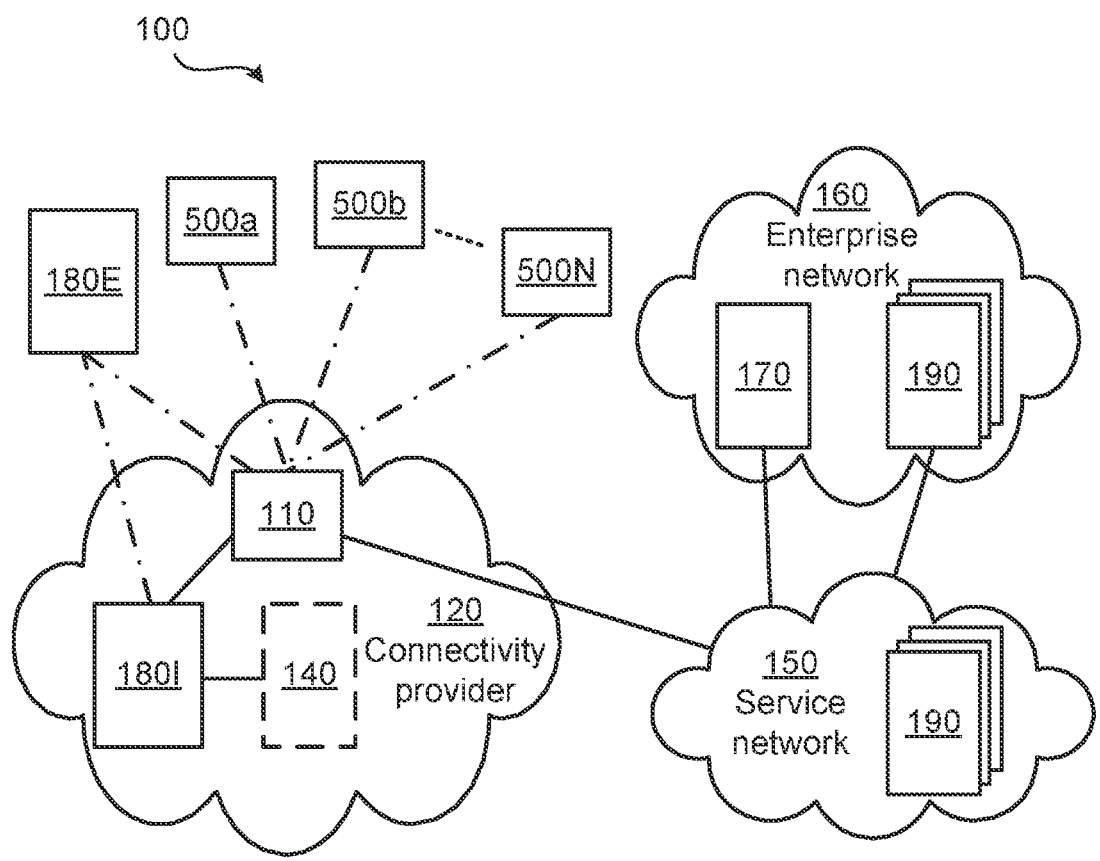
FIG. 1 is a schematic diagram illustrating a communication network according to embodiments.
Figure 20:
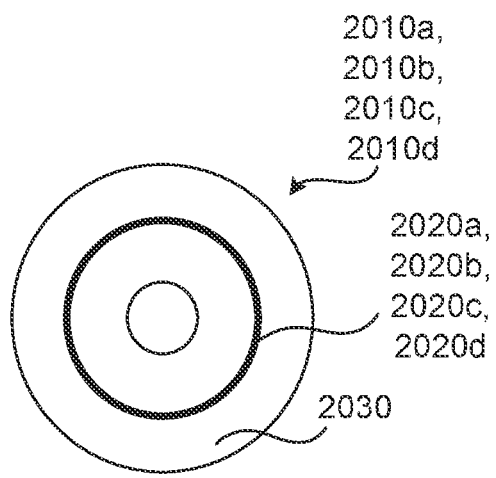
FIG. 20 shows one example of a computer program product comprising computer readable means according to an embodiment.
Figure 2:
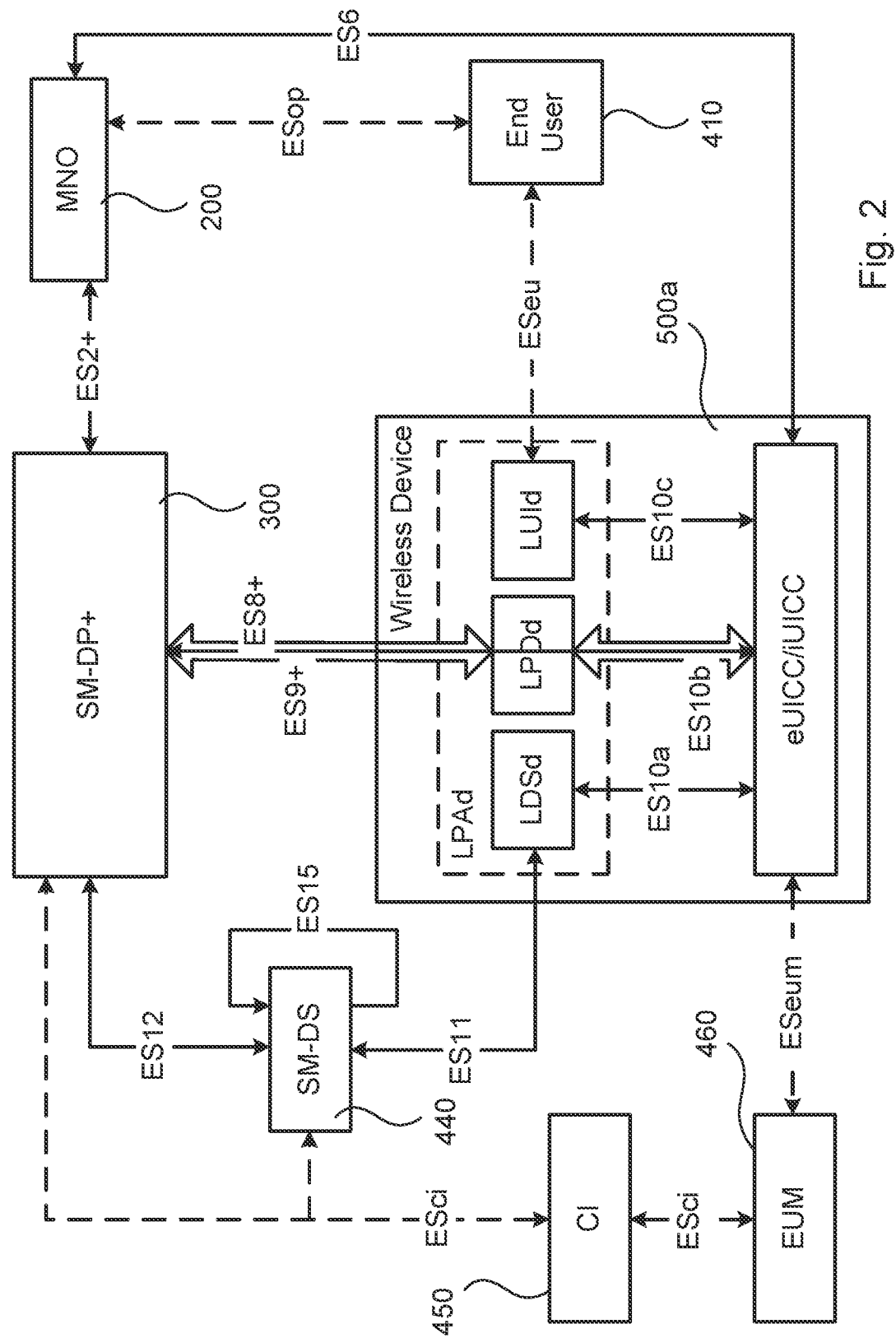
FIG. 2 is a schematic illustration of an architecture for connectivity management.
Figure 3:
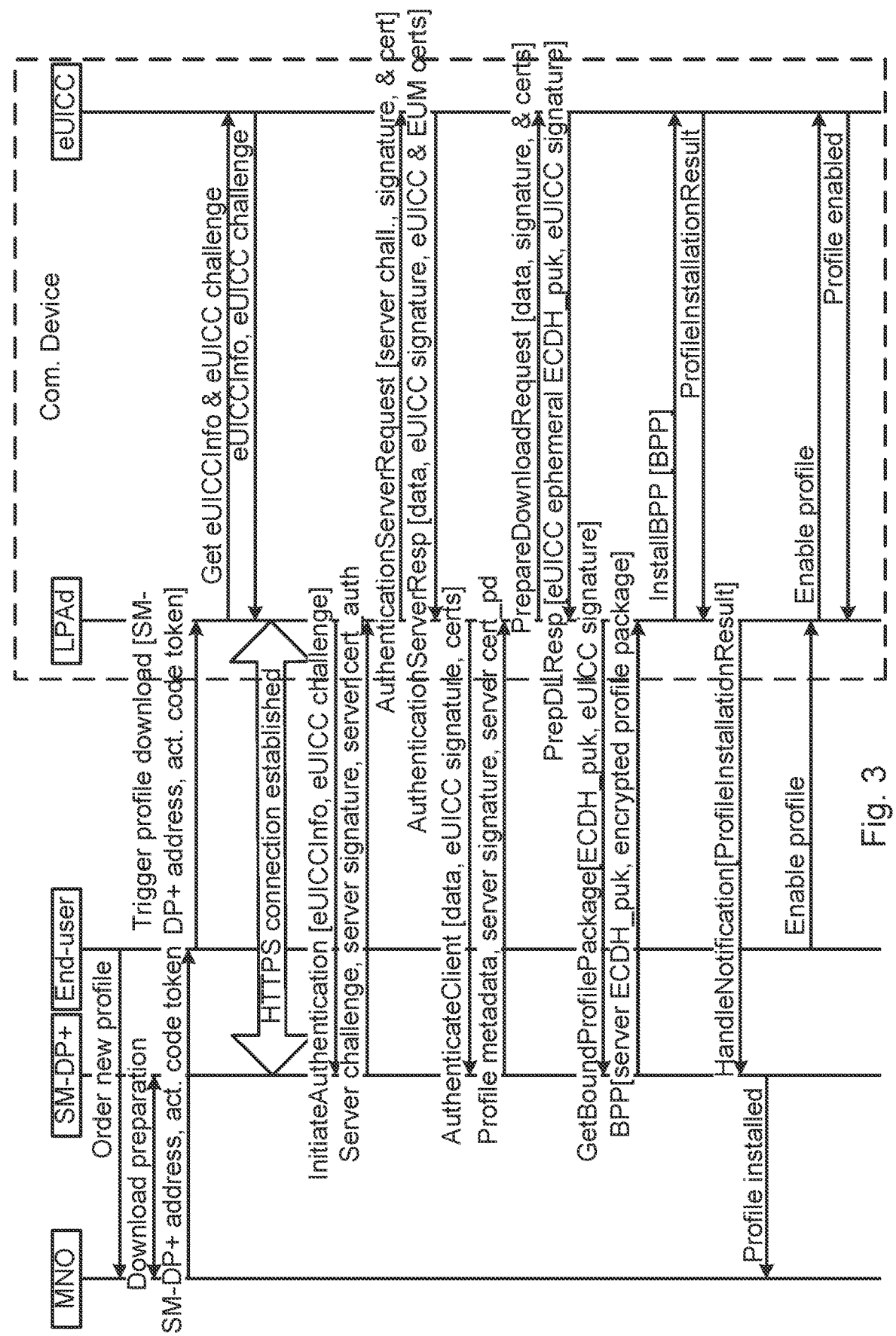
FIG. 3 is a signalling diagram.

FIG. 20 shows one example of a computer program product 2010a, 2010b, 2010c comprising computer readable means 2030. On this computer readable means 2030, a computer program 2020a can be stored, which computer program 2020a can cause the processing circuitry 210 and thereto operatively coupled entities and devices, such as the communications interface 220 and the storage medium 230, to execute methods according to embodiments described herein. The computer program 2020a and/or computer program product 2010a may thus provide means for performing any steps of the MNO entity 200 as herein disclosed. On this computer readable means 2030, a computer program 2020b can be stored, which computer program 2020b can cause the processing circuitry 310 and thereto operatively coupled entities and devices, such as the communications interface 320 and the storage medium 330, to execute methods according to embodiments described herein. The computer program 2020b and/or computer program product 2010b may thus provide means for performing any steps of the profile provisioning server 300 as herein disclosed. On this computer readable means 2030, a computer program 2020c can be stored, which computer program 2020c can cause the processing circuitry 410 and thereto operatively coupled entities and devices, such as the communications interface 420 and the storage medium 430, to execute methods according to embodiments described herein. The computer program 2020c and/or computer program product 2010c may thus provide means for performing any steps of the profile management entity 400 as herein disclosed. On this computer readable means 2030, a computer program 2020d can be stored, which computer program 2020d can cause the processing circuitry 510 and thereto operatively coupled entities and devices, such as the communications interface 520 and the storage medium 530, to execute methods according to embodiments described herein. The computer program 2020c and/or computer program product 2010c may thus provide means for performing any steps of the wireless device 500a as herein disclosed.

In the example of FIG. 20, the computer program product 2010a, 2010b, 2010c is illustrated as an optical disc, such as a CD (compact disc) or a DVD (digital versatile disc) or a Blu-Ray disc. The computer program product 2010a, 2010b, 2010c could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 2020a, 2020b, 2020c is here schematically shown as a track on the depicted optical disk, the computer program 2020a, 2020b, 2020c can be stored in any way which is suitable for the computer program product 2010a, 2010b, 2010c.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method of operating a wireless device to handle a subscription profile, the method comprising:
   obtaining from a profile management entity a first message comprising a batch profile handling parameter and a matching identifier,
   wherein the batch profile handling parameter is common for a set of wireless devices to which the wireless device belongs,
   wherein the set of wireless devices are associated with at least one matching identifier for tracking actions relating to handling of the subscription profiles at a mobile network operator, MNO, entity and a profile provisioning server; and
   responsive to obtaining the first message, transmitting a second message to the profile provisioning server, the second message comprising the matching identifier as signed by the wireless device,
   wherein tracking the actions comprises tracking a profile download order.

2. The method according to claim 1, wherein handling of the subscription profiles at the MNO entity and the profile provisioning server comprises subscription download to the set of wireless devices.

3. The method according to claim 1, wherein handling of the subscription profiles at the MNO entity and the profile provisioning server comprises remote profile management of the set of wireless devices.

4. The method according to claim 3, wherein the set of wireless devices are bound to a common batch profile handling parameter.

5. The method according to claim 1, wherein there is one single matching identifier common for all of the wireless devices in the set of wireless devices, or one range of matching identifiers for the set of wireless devices.

6. The method according to claim 1, wherein a common confirmation code is selected for the set of wireless devices.

7. The method according to claim 6, wherein each wireless device in the set of wireless devices uses a device specific confirmation code computed based on the common confirmation code and a device identifier of the wireless device.

8. The method according to claim 1, wherein the batch profile handling parameter comprises a batch identifier generated by the MNO entity as part of performing the preparation procedure.

9. The method according to claim 8, wherein the batch identifier is used as device identifier during registration with a Subscription Manager-Discovery Server (SM-DS) of an event of the handling of the subscription profiles.

10. The method according to claim 8, wherein the batch identifier is obtained from the profile management entity.

11. The method according to claim 8, wherein the procedure for handling the subscription profile at the wireless device comprises:
obtaining the matching identifier for use when sending the second message to the profile provisioning server.

12. The method according to claim 11, wherein obtaining the matching identifier comprises:
sending, to a Subscription Manager-Discovery Server (SM-DS), a request message to check for events at the SM-DS that are valid for the wireless device and valid for the set of wireless devices identified by the batch identifier, wherein the request comprises the batch identifier, a signature computed over the batch identifier, and the device identifier; and
receiving, from the SM-DS, a response message comprising an event, whereupon the wireless device checks that the event matches the profile handling procedure, and extracts the event identifier for use as the matching identifier.

13. The method according to claim 8, further comprising:
receiving, from the profile management entity, a request message comprising the batch identifier and, upon receiving this message:
signing the batch identifier; and
providing, to the profile management entity, a response message comprising the signature computed over the batch identifier, and the device identifier.

14. The method according to claim 1, wherein the batch profile handling parameter comprises an activation code for the set of wireless devices generated by the MNO entity.

15. The method according to claim 14, wherein the activation code comprises a common matching identifier, and wherein the matching identifier is used in the procedure for profile handling for each wireless device in the set of wireless devices.

16. The method according to claim 15, wherein the activation code is comprised in the first message obtained from the profile management entity as part of the procedure for handling the subscription profile.

17. The method according to claim 16, wherein the selected matching identifier and the activation code are comprised in the first message obtained from the profile management entity as part of the procedure for handling the subscription profile.

18. The method according to claim 14, wherein the activation code comprises a range of matching identifiers, and wherein one matching identifier from the range of matching identifiers is assigned per wireless device from the set of wireless devices, such that each wireless device in the set of wireless devices uses a unique matching identifier in the procedure for profile handling.

19. The method according to claim 14, wherein the activation code comprises a common matching identifier for the set of wireless devices, and wherein the common matching identifier is the batch identifier.

20. A mobile network operator, MNO, entity for handling subscription profiles for a set of wireless devices, the MNO entity comprising:
processing circuitry; and
memory coupled to the processing circuitry and having instructions stored therein that are executable by the processing circuitry to cause the MNO entity to perform operations comprising:
obtaining a single request for handling subscription profiles for the set of wireless devices; and
performing a preparation procedure for the set of wireless devices,
wherein a common batch profile handling parameter for the set of wireless devices is created,
wherein the set of wireless devices are associated with at least one matching identifier for tracking actions relating to handling of the subscription profiles at the MNO entity and the profile provisioning server, and
wherein tracking the actions comprises tracking a profile download order.

21. A profile provisioning server for handling subscription profiles for a set of wireless devices, the profile provisioning server comprising:
processing circuitry; and
memory coupled to the processing circuitry and having instructions stored therein that are executable by the processing circuitry to cause the profile provisioning server to perform operations comprising:
performing, with an MNO entity, a preparation procedure for the set of wireless devices,
wherein a common batch profile handling parameter for the set of wireless devices is created,
wherein the set of wireless devices are associated with at least one matching identifier for tracking actions relating to handling of the subscription profiles at the MNO entity and the profile provisioning server, and
wherein tracking the actions comprises tracking a profile download order; and
performing, with a profile management entity and one of the wireless devices, a procedure for handling the subscription profile of the wireless device, during which procedure the profile provisioning server receives from the wireless device a message comprising the matching identifier as signed by the wireless device.

* * * * *